United States Patent [19]
Peill et al.

[11] Patent Number: 6,051,194
[45] Date of Patent: Apr. 18, 2000

[54] TI02-COATED FIBER OPTIC CABLE REACTOR

[75] Inventors: Nicola J. Peill, Pasadena; Michael R. Hoffman, South Pasadena, both of Calif.

[73] Assignee: California Institute of Technology, Pasadena, Calif.

[21] Appl. No.: 09/158,412

[22] Filed: Sep. 22, 1998

Related U.S. Application Data

[62] Division of application No. 08/654,093, May 28, 1996, Pat. No. 5,875,384.
[60] Provisional application No. 60/000,155, Jun. 12, 1995.
[51] Int. Cl.[7] .................................................. B01J 19/08
[52] U.S. Cl. ........................ 422/186; 422/121; 422/186.3
[58] Field of Search .......................... 422/121, 24, 186.3, 422/186; 588/227; 204/157.3

[56] References Cited

U.S. PATENT DOCUMENTS

| | | | |
|---|---|---|---|
| 5,035,784 | 7/1991 | Anderson et al. | 204/158.14 |
| 5,118,422 | 6/1992 | Cooper et al. | 210/636 |
| 5,137,607 | 8/1992 | Anderson et al. | 204/59 R |
| 5,262,066 | 11/1993 | Van Saye et al. | 210/748 |
| 5,302,356 | 4/1994 | Shadman et al. | 422/186.3 |
| 5,308,454 | 5/1994 | Anderson | 204/59 R |
| 5,374,405 | 12/1994 | Firnberg et al. | 422/186.3 |
| 5,468,699 | 11/1995 | Zhang et al. | 502/60 |
| 5,536,469 | 7/1996 | Tamme et al. | 422/186 |
| 5,547,823 | 8/1996 | Murasawa et al. | 430/531 |
| 5,564,065 | 10/1996 | Fleck et al. | 422/186.3 |
| 5,875,384 | 2/1999 | Peill et al. | 422/186.3 |

OTHER PUBLICATIONS

*Hoffmann, M.R.; Martin, S.T.; Choi, W.; Bahnernann, D.W.; "Environmental Applications of Semiconductor Photocatalysis", *Chemical Reviews* 1995, 95, 69–96.

*Abdullah, M.; Low, G.K.C.; Matthews, R.; "Effects of Common Inorganic Anions on Rates of Photocatlytic Oxidation of Organic Carbon over Illuminated Titanium Dioxide", *J. Phys. Chem.* 1990, 94, pp. 6820–6825.

*Kormann, C.; Bahnemann, D. W.; Hoffmann, R.R.; "Preparation and Characterization of Quantum–Size Titanium Dioxide", *J. Phys. Chem.* 1988, 92, 5196.

*Kormann, C.; Bahnemann, D. W.; Hoffmann, M.R.; "Photolysis of Chloroform and Other Organic Molecules in Aqueous $TiO_2$ Suspensions", *Environ. Sci. Tech.* 1991, 25, 494–500.

*Prairie, M.R.; Evans, L.R.; Stange, B.M.; Martinez, S.L.; "An Investigation of $TiO_2$ Photocatalysis for the Treatment of Water Contaminated with Metals and Organic Chemicals", *Environ. Sci. Tech.* 1993, 27, 1776–1782.

*Matthews, R. W.; *Wat. Res.* 1986, 20, 569.

*Choi, W.; Termin, A.; Hoffmann, M.R.; "The Role of Metal Ion Dopants in Quantum–Sized $TiO_2$: Correlation between Photoreactivity and Charge Carrier Recombination Dynamics", *The Journal of Physical Chemistry*, Jul. 15, 1994, pp. 13669–13679.

*Fox, M.A.; "Photoinduced Electron Transfer", *Photochem. Photobiol.* vol. 52, No. 3, 1990, 617–627.

(List continued on next page.)

*Primary Examiner*—Elizabeth McKane
*Attorney, Agent, or Firm*—Limback & Limback L.L.P.

[57] ABSTRACT

A photochemical reactor system employing an optical fibers in the form of a cable to transmit light to solid-supported $TiO_2$-containing photocatalyst is disclosed. Light energy is transmitted to $TiO_2$-containing particles, chemically anchored onto one or more quartz fiber cores, via radial refraction of light out of each fiber. $TiO_2$-containing coating layer minimizes the interfacial surface area of the quartz core and $TiO_2$-containing particles and operation with incident irradiation angles near 90° enhance light propagation along the fibers. A maximum quantum efficiency of $\phi=1.1\%$ for the oxidation of 4-chlorophenol was achieved. Fiber efficiency permits the light source to be separated from the photocatalyst.

3 Claims, 9 Drawing Sheets

OTHER PUBLICATIONS

*Matthews, R.W.; "Kinetics of Photocatalytic Oxidation of Organic Solutes over Titanium Dioxide", *J. Catal.* 1988, 111, 264–272.

*Turchi, C.S.; Ollis, D.F.; "Photocatalytic Degradation of Organic Water Contaminants: Mechanisms Involving Hydroxyl Radical Attack", *J. Catal.* 1990, 122, 178–192.

*Yamazaki–Nishida, S.; Nagano, K.J.; Phillips, L.A.; Cervera–March, S.; Anderson, M.A.; "Photocatalytic Degradation of Trichloroethylene in the Gas Phase Using Titanium Dioxide Pellets", *J. Photochem. Photobiol. A: Chem.* 1993, 70, 95–99.

*Xu, Y.M.; Menassa, P.E.; Langford, C.H.; "Photodecomposition of Several Chloroaromatics Using A Commercial Prototype Reactor", *Chemosphere* 1988, 17, 1971–1976.

*Wyness, P.; Klausner, J.F.; Goswami, D.Y.; Schanze, K.S.; "Performance of Nonconcentrating Solar Photocatalytic Oxidation Reactors, Part I: Flat–Plate Configuration", *J. Solar Engy. Engi. Trans. ASME* 1994, 116, 2–7.

*Dibble, L.A.; Raupp, G.B.; "Fluidized–Bed Photocatalytic Oxidation of Trichloroethylene in Contaminated Airstreams", *Environ. Sci. Tech.* 1992, 26, 492–495.

*Peral, J.; Ollis, D.F.; "Heterogeneous Photocatalytic Oxidation of Gas–Phase Organics for Air Purification: Acetone, 1–Butanol, Butyraldehyde, Formaldehyde, and m–Xylene Oxidation", *J. Catal.* 1992, 136, 554–565.

*Yue, P.L.; Khan, F.; Rizzuti, L.; "Photocatalytic Ammonia Synthesis in a Fluidised Bed Reactor", *Chemi. Eng. Sci.* 1983, 38, 1893–1900.

*Ollis, D.F.; Marinangeli, R.E.; "Photoassisted Heterogenious Catalysis with Optical Fibers"; *AIChE Journal*, Jul. 1977, vol. 23, pp. 415–424.

*Ollis, D.F.; Marinangeli, R.E.; "Photo–Assisted Heterogeneous Catalysis with Optical Fiblers—II. Nonisothermal Single Fiber and Fiber Bundle", *AIChE J.*, Nov. 1980, vol. 26, No. 6, pp. 1000–1006.

*Hofstadler, K.; Bauer, R.; Novalic, S.; Heisler, G.; "New Reactor Design for Photocatalytic Wastewater Treatment with $TiO_2$ Immobilized on Fused–Silica Glass Fibers: Photomineralization of 4–Chlorophenol"; *Environ. Sci. Tech.* 1994, 28, pp. 670–674.

*Gapen, D.C.; "Photocatalytic Degradation of Chlorinated Hydrocarbons", Thesis for M.S. (Chemical Engineering), University of Wisconsin, Madison, Wisconsin 1991.

*Xu, Q.Y.; Anderson, M.A.; "Synthesis of Porosity Controlled Ceramic Membranes", *J. Mat. Res.* 1991, 6, 1073–1081.

*Hu, L.L.; Yoko, T.; Kozuka, H. Sakka, S.; "Effects of Solvent on Properties of Sol–gel–derived $TiO_2$ Coating Films", *Thin Solid Films* 1992, 219, 18–23.

*Aluminium Oxide C, Titanium Dioxide P 25—Two Highly Dispersed Metallic Oxides from Degussa Produced by the Aerosil©–Process, *Degussa Technical Bulletin*, 1990, No. 56.

*Heller, H.G.; Langan, J.R.; "Photochromic Heterocyclic Fulgides. Part 3. The Use of (E)–α–(2, 5–Dimethyl–3–furylethylidene) (isopropylidene)succinic Anhydride as a Simple Convenient Chemical Actinometer", *J. Chem. Soc. Perkin. Trans.* 1981, 2, 341–343.

*Mills, A.; Morris, S.; "Photomineralization of 4–chlorophenol Sensitized by Titanium Dioxide: A Study of the Initial Kinetics of Carbon Dioxide Photogeneration", *Photochem. Photobiol. A: Chem.* 71, 1993, 75–83.

*Bruno, W.M.; "Powder Core Dielectric Waveguides," California Institute of Technology, Jan. 31, 1986, pp. 145–167.

*Bickley, R.I.; Gonzalez–Caffeno, T.; Lees, J.S.; Palmisano, L.; Tilley, R.J.D.; "A Structural Investigation of Titanium Dioxide Photocatalysts", *J. Solid State Chem.* 1991, vol. 92, pp. 178–190.

*Aguado, M.A.; Anderson, M.A.; Hill, C.G.; Influence of light intensity and membrane properties on the photocatalytic degradation of formic acid over $TiO_2$ ceramic membranes; *Journal of Molecular Catalysis*, 1994, vol. 89, pp. 165–178.

*Orgaz, F.; Capel, F.; "A Semi–empirical Model for Coating Flat Glass by Dipping into Metal–organic Solutions", *J. Mat. Sci.* 1987, 22, 1291–1294.

*Tseng, J.M.; Huang, C. P.; "Removal of Chlorophenols From Water by Photocatalytic Oxidation", *Wat. Sci. Tech.* 1991, 23, 377–387.

*Al–Sayyed, G.; D'Oliveira, J.C.; Pichat, P.; "Semiconductor–sensitized photodegradation of 4–chlorophenol in Water", *J. Photochem. Photobiol. A: Chem.* 1991, vol. 58, pp. 99–114.

*Albery, W.J.; Brown, G.T.; Darwent, J.R.; Saievar–Iranizad, E.; "Time–resolved Photoredox Reactions of Colloidal CdS", *J. Chem. Soci. Farad. Trans. I*, 1985, vol. 81, pp. 1999–2007.

*Mills, G.; Hoffmann, M.R.; "Photocatalytic Degradation of Pentachlorophenol on $TiO_2$ Particles: Identification of Intermediates and Mechanism of Reaction", *Environ. Sci. Tech.* 1993, 27, 1681–1689.

*Martin, S.T.; Morrison, C.L.; Hoffmann, M.R.; "Photochemical Mechanism of Size–Quantized Vanadium–Doped $TiO_2$ Particles", *J. Phys. Chem.* 1994, 13695–13704.

*Konenkamp, R.; Henninger, R.; Hoyer, P.; "Photocarrier Transport in Colloidal $TiO_2$ Films", *J. Phys. Chem.* 1993, 97, 7328–7330.

*Liu, D.; Kamat, P.V.; "Photoelectrochemical Behavior of Thin CdSe and Coupled $TiO_2$/CdSe Semiconductor Films", *J. Phys. Chem.* 1993, 97, 10769–10773.

*Sodergren, S.; Hagfeldt, A.; Olsson, J.; Lindquist, S.E.; "Theoretical Models for the Action Spectrum and the Current–Voltage Characteristics of Microporous Semiconductor Films in Photoelectrochemical Cells", *J. Phys. Chem.* 1994, 98, 5552–5556.

*Vogel, R.; Hoyer, P.; Weller, H.; "Quantum–Sized PbS, CdS, $Ag_2S$, $Sb_2S_3$, and $Bi_2S_3$ Particles as Sensitizers for Various Nanoporous Wide–Bandgap Semiconductors", *J. Phys. Chem.* 1994, 98, 3183–3188.

*Choi, W.; Termin, A.; Hoffman, M.R.; "Effects of Metal–Ion Dopants on the Photocatalytic Reactivity of Quantum–Sized $TiO_2$ Particles", *Angewandte Chemie*(International Edition in English) Reprint 1993/1994, vol. 33, No. 10, pp. 1090–1092.

*Pelizzetti, E.; Carlin, V.; Minero, C.; Grätzel, M.; "Enhancement of the Rate of Photocatalytic Degradation on $TiO_2$ of 2–Chlorophenol, 2,7–Dichlorodibenzodioxin and Atrazine by Inorganic Oxidizing Species", *New J. Chem.* 1991, 15, 351–359.

*Hoffman, A.J.; Yee, H.; Mills, G.; Hoffmann, M.R.; "Photoinitiated Polymerization of Methyl Methacrylate Using Q–Sized ZnO Colloids", *Journal Physical Chemistry* 1992, 96, 5540–5546.

*Erbs, W.; Desilvestro, J.; Borgarello, E.; Gratzel, M.; "Visible–Light–Induced $O_2$ Generation from Aqueous Dispersions of $WO_3$", *J. Phys. Chem.* 1984, 88, 4001–4006.

*Herrmann, J.M.; Disdier J.; Pichat, P.; "Photoassisted Platinum Deposition on TiO₂ Powder Using Various Platinum Complexes", *J. Phys. Chem.* 1986, 90, No. 22, 6028–6034.

*Sabate, J; Anderson, M.A.; Aguiado, M.A.; Gimenez, J.; Ccervera–March, S.; Hill, C.G.; *J. Mol. Catal.* 1992, 71, 57.

*Peill, Nicola J.; Hoffman, Michael R.; "Development and Optimization of TiO₂–Coated Fiber–Optic Cable Reactor; Photocatalytic Degradtion of 4–Chlorophenol" *Environ. Sci. Technol,* 1995, 29, 2974–2981.

N.J. Peill et al., "Solar–Powered Photocatalytic Fiber–Optic Cable Reactor for Waste Stream Remediation," J. Solar Energy Engineering, Aug. 1997, vol. 119, pp. 229–236.

Nicola J. Peill et al., "Iron(III)–doped Q–sized TiO₂ coatings in a fiber–optic cable photochemical reactor," J. of Photochemistry and Photobiology A: Chemistry 108 (1997) pp. 221–228.

Nicola J. Peill et al., "Mathematical Model of a Photocatalytic Fiber–Optic Cable Reactor for Heterogeneous Photocatalysis," Environ. Sci. Technol. 1998, 32, pp. 398–404.

Nicola J. Peill et al., "Chemical and Physical Characterization of a TiO₂–Coated Fiber Optic Cable Reactor," Environmental Science & Technology, vol. 30, No. 9, pp. 2806–2812, May, 1996.

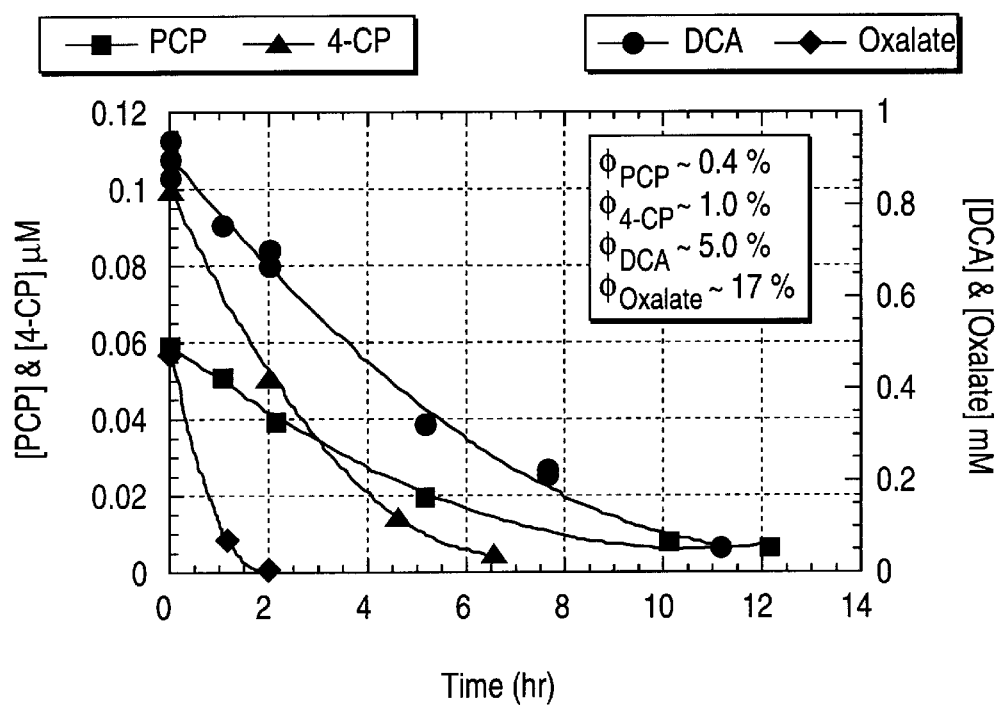
FIGURE 11
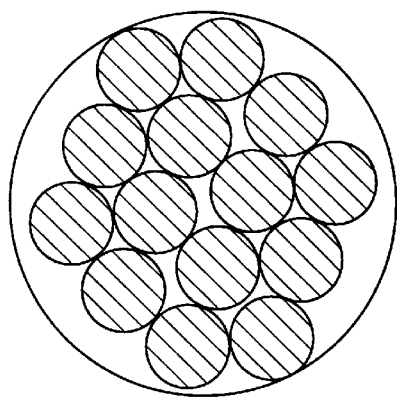 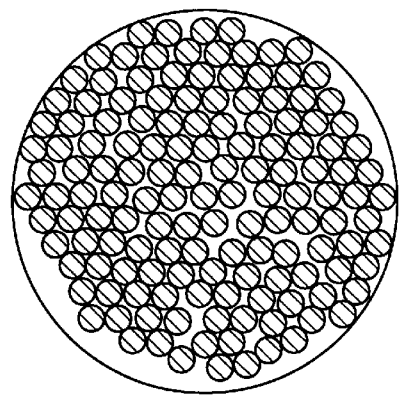
14 Fibers  140 Fibers
FIGURE 12A  FIGURE 12B

TIO2-COATED FIBER OPTIC CABLE REACTOR

This is a divisional of application Ser. No. 08/654,093, filed May 28, 1996, now U.S. Pat. No. 5,875,384. This application claims benefit of Provisional Application Ser. No. 60/000,155, filed Jun. 12, 1995.

ORIGIN OF INVENTION

The U.S. Government has certain rights in this invention pursuant to Grant No. N00014-92-J-1901 awarded by the Navy (ARPA).

REFERENCE TO RELATED APPLICATIONS

The present application is a nonprovisional application filed under 35 U.S.C. §111(a) and claims priority under 35 U.S.C. §119(e)(1) to the provisional application filed under 35 U.S.C. §111(b) entitled "Development and Optimization of a TiO$_2$-Coated Fiber Optic Cable Reactor", by N. Peill and M. Hoffmann, Ser. No. 60/000155, filing date Jun. 12, 1995.

TECHNICAL FIELD

The present invention is generally directed to the photocatalytic degradation of organic or inorganic pollutants using supported metal oxide semiconductor catalysts. More specifically, the present invention relates to TiO$_2$-coated fiber optic cable reactors and their use in the degradation of organic and inorganic pollutants.

BACKGROUND OF THE INVENTION

Heterogeneous photocatalysis on metal oxide semiconductor particles has been shown to be an effective means of removing organic and inorganic pollutants from water and air streams. The effects of photocatalyst composition, structure, crystal size, band gap energy, incident light intensity, and the nature of the electron donors and acceptors on photocatalytic reactivity have been investigated.

Photochemically-excited semiconductor particles can catalyze the reduction and/or oxidation of a variety of chemical species. Charge-pair generation is achieved by the absorption of a photon with an energy greater than or equal to its band gap energy. The absorbed photon promotes an electron from the valence band into the conduction band, and in doing so, creates a positively charged valence band hole. Excited-state electrons and holes can either: (i) recombine with the release of heat; (ii) migrate through the lattice structure to various trapped sites; or (iii) migrate to the particle surface and participate in electron transfer reactions as reported by Hoffmann, et al., *Chem. Rev.*, 1995, 95, 69. Surface-trapped conduction band electrons can reduce surface-bound oxidants (+0.5 V to −1.5 V vs NHE depending on the semiconductor and pH), while valence-band holes are capable of oxidizing a wide range of electron donors (+1.0 V to +3.5 V vs NHE).

Hydroxyl radicals, formed from the oxidation of vicinal water or bound hydroxyl groups, are generally believed to be the principal reactive species responsible for the photo-oxidation of organic compounds in semiconductor photocatalysis. In some cases, direct hole transfer ($h^+_{vb}$) via a photo-Kolbe mechanism has also been shown to be an important oxidation pathway. Surface-bound OH• radicals are produced by the oxidation of titanol groups by valence band holes as follows:

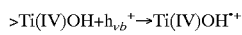 (1)

Direct electron transfer (i.e., hole transfer) may occur as follows:

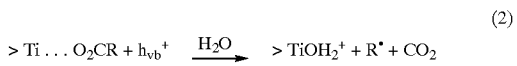 (2)

Charge neutrality of the particle is maintained by concurrent reduction via conduction band electrons. In an aerated system, oxygen is reduced and forms superoxide and/or hydroperoxyl radicals. These species can be further reduced to form hydroxyl radicals.

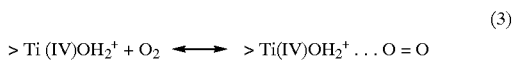 (3)

(4)

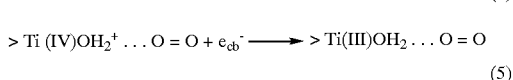

(5)

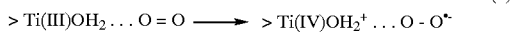

In addition to oxygen, other species present in the liquid phase (e.g., CCl$_4$) may be reduced if the reduction potential of the species is more positive than the conduction band energy.

Practical application of metal oxide semiconductors as photocatalysts often requires immobilization of the photocatalyst in a fixed-bed reactor configuration that allows the continuous use of the photocatalyst for treating aqueous or gaseous effluent streams by eliminating the need for post-process filtration. In conventional fixed-bed reactors, the photocatalyst is coated on the walls of the reactor, on a support matrix, or around a casing containing the light source. However, these configurations present several drawbacks such as low light utilization efficiencies due to absorption and scattering of the light by the reaction medium and restricted processing capacities due to mass transport limitations. A novel approach to solving these problems employing optical fibers as a means of light transmission and distribution to solid-supported photocatalysts was first proposed by Ollis and Marinangeli in their papers, *AIChE J.*, 1977, 23, 415 and *AIChE J.*, 1980, 26, 1000. However, they predicted that photocatalytic optical fiber reactor systems would not be practical due to catalyst deactivation caused by heat buildup in a bundled array. Hofstadler, et al. in their paper reported at *Environ. Sci. Tech.*, 1994, 28, 670, have shown recently that TiO$_2$-coated quartz fiber rods fixed in a tubular reactor configuration using a light source adjacent to the reactor can be used to carry out oxidation of 4-chlorophenol. They reported effective quantum yields of 0.0002. In a 1991 masters thesis by D. C. Gapen, "Photocatalytic Degradation of Chlorinated Hydrocarbons", Univ. of Wisconsin, use of an optical fiber cable reactor (hereinafter "FOCR") for photocatalytic oxidation was investigated. Problems with delamination of the TiO$_2$ coating resulted in partial degradation of 3-chlorosalicylic acid. However, a maximum quantum efficiency of 0.069 for the partial photolytic and photocatalytic oxidation of 3-chlorosalicylic acid was estimated.

Optical fibers in an FOCR can be treated as elementary waveguides having a core with an outer reactive layer. In this case, light in the form of a plane wave propagating in the core medium (designated by the subscript "1") having a refractive index $n_1$, and which is incident on an interface with the outer medium (designated by the subscript "2") having a refractive index $n_2$, is partially reflected and partially refracted. Snell's Law states that the ratio of the sine of the wave's incident angle, $\theta_i$, and the sine of the wave's refracted angle, $\theta_{refr}$, is constant. This ratio is equal to the ratio of the wave's velocities in the respective mediums and the inverse ratio of the refractive indices according to the formula, $$\frac{\sin\theta_i}{\sin\theta_{refr}} = \frac{v_1}{v_2} = \frac{n_2}{n_1} \qquad (6)$$

For fibers in which $n_1$ is higher than $n_2$, the propagating wave will be reflected within the fiber with 100% efficiency when the angle of incidence exceeds the critical angle. This critical angle, $\theta_c$, is defined as the arcsine of the ratio of the refractive indices of the core and outer mediums. Some refraction will occur if the angle of incidence is less than the critical angle. However, if $n_1$ is less than $n_2$, then refraction will occur for all incident angles.

If the interface of the core and outer mediums absorbs the incident light with an absorption coefficient $\alpha$, in units of inverse length, $n_2$ is replaced with a complex refractive index, $\hat{n}_2$:

$$\hat{n}_2 = \hat{n}_2 (1-i\kappa_2) \qquad (7)$$

The attenuation index, $\kappa$, is related to $\alpha$ by $$n\kappa = \alpha c/4\pi v \qquad (8)$$

where c and v are the velocities of the light wave in a vacuum and in the medium, respectively.

For all wavelengths, the index of refraction of a single TiO$_2$ rutile crystal is greater than that for quartz, which is constant at about 1.4 (personal communication between the inventors and R. H. French of DuPont Co., 1994). Values for n for wavelengths that are not absorbed by TiO$_2$ ($\lambda>375$ nm) are constant at about 2.8. As the wavelength approaches the absorption onset of the photocatalyst, the index of refraction of the TiO$_2$ crystal increases, reaching 5.5 at about 300 nm. Values for $\kappa$ similarly increase from 0 to about 1.5. As a consequence, incident light will be refracted to some degree for all incident angles. The ratio of the energy transmission to the TiO$_2$ coating to the incident radiation at each reflection depends on the incident angle, the wavelength, and the refractive indices according to the Fresnel equations:

$$\left(\frac{E_r}{E_i}\right)_\perp = 1 - \left|\frac{n_1\cos\theta_i - ([(n_2 - i\kappa_2)^2 - n_1^2\sin^2\theta_i])^{1/2}}{n_1\cos\theta_i + ([(n_2 - i\kappa_2)^2 - n_1^2\sin^2\theta_i])^{1/2}}\right|^2 \qquad (9)$$

$$\left(\frac{E_r}{E_i}\right)_{//} = 1 - \left|\frac{(n_2 - i\kappa_2)^2\cos\theta_i - [(n_2 - i\kappa_2)^2 - n_1^2\sin^2\theta_i]^{1/2}}{(n_2 - i\kappa_2)^2\cos\theta_i + n_1[(n_2 - i\kappa_2)^2 - n_1^2\sin^2\theta_i]^{1/2}}\right|^2 \qquad (10)$$

where $E_r$ and $E_i$ are the energies of the refracted and incident radiation, respectively, and the subscripts $\perp$ and $//$ refer to the transverse electric and magnetic (TE and TM, respectively) polarizations of the incident light. The refraction for perpendicular polarizations monotonically decreases from a given value at normal incidence (0°) to zero at the grazing angle, parallel to the quartz-coating interface. The refraction for parallel polarizations increases as the incident angle increases, reaching a maximum of 100% at Brewster's angle, ($\theta_B = \tan^{-1} n_1/\hat{n}_2$), and then falls sharply to zero as the incident angle approaches the grazing angle. The shapes of these curves are a function of the indices of refraction for quartz and the TiO$_2$ particles (complex) and the extinction coefficient of the photocatalyst. Light incident upon a quartz-water or quartz-air interface, representative of a coating pore interface, will be totally internally reflected for incident angles greater than the corresponding critical angle with no refracted transmission of energy because the refractive index of the quartz core is greater than that of air and water. This assumption is an oversimplification of the system since the wavelength is probably at least an order of magnitude greater than the interfacial pore surface area. In this case, the interaction between the pore interface and the photon is a function of the "effective" refractive index of the pore interface. In the 1986 work by W. M. Bruno ("Powder Core Dielectric Wave Guides," Caltech Thesis, Pasadena, 1986) it has been postulated that for a powder material composed of particles, which are small compared to the incident wavelength, the refractive index of the material will be a statistical composite of the refractive indices of the particles and the void material (e.g., H$_2$O). In addition, the absorption of the material increases significantly as the packing fraction of the powder increases.

SUMMARY OF THE INVENTION

The present invention generally relates to a fixed bed photocatalytic reactor system that employs optical fibers as a means of remote light transmission to and support for a photocatalyst coating. The reactor enables batch treatment or continuous flow applications, e.g., for the destruction of gas or aqueous phase waste effluents contaminated with hydrocarbons or heavy metals.

According to one aspect of the invention, the reactor utilizes one or more optical fibers that are positionally secured with respect to a reactor vessel and are spaced with respect to each other. The fibers have a noncatalytic portion and a catalytic portion, wherein the catalytic portion comprises a TiO$_2$ photocatalyst coating on the exposed fibers. Photocatalytic reactions are carried out by using the noncatalytic portion of the fibers to transmit light, e.g., UV, from a light source to the catalytic portion. Because of the efficiency of the fibers in light delivery to the catalytic portion of the coating, the light source may be located a relatively long distance from the catalytic portion of the fibers.

In another aspect of the present invention, the TiO$_2$-containing photocatalytic coating is formed on the fibers by applying the coating as a hydrosol.

In a further aspect of the present invention, the coating comprises a nonphotoactive filler.

BRIEF DESCRIPTION OF THE DRAWINGS

The various features of the present invention may be more fully understood with reference to the following description, and the accompanying drawings in which:

FIG. 11 is a graph summarizing oxidations of 4-chlorophenol, dichloroacetate, pentachlorophenol and oxalate as functions of time; and FIG. 12 is an illustration of the relationship between fiber number density and light flux.

DETAILED DESCRIPTION OF THE INVENTION

Figure 1:
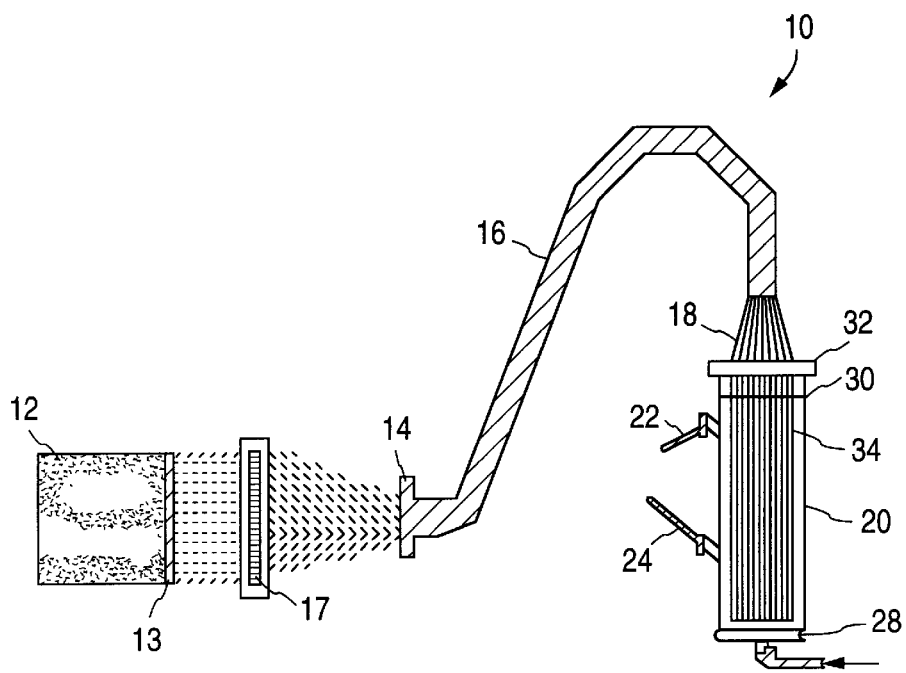
FIG. 1 presents a schematic diagram of an optical fiber photocatalytic reactor system according to the present invention.

FIG. 1 presents a schematic diagram of an optical fiber photocatalytic reactor system according to the present invention. The reactor system 10 generally includes a light source 12, a band pass filter 13 (optional), a fiber bundle positioner 14 for bundle 16 of fibers 18 made, for example, of a uv transmitting material and preferably, quartz, a quartz lens 17, and a reaction vessel 20 containing a liquid or gaseous phase reaction solution. The reaction vessel 20 has sampling ports 22, 24, a gas inlet 26 and a glass frit 28 for oxygenation and mixing of the reaction solution and a bottom spacer/lid 30 through which the fibers pass into the reaction vessel.

Figure 2:
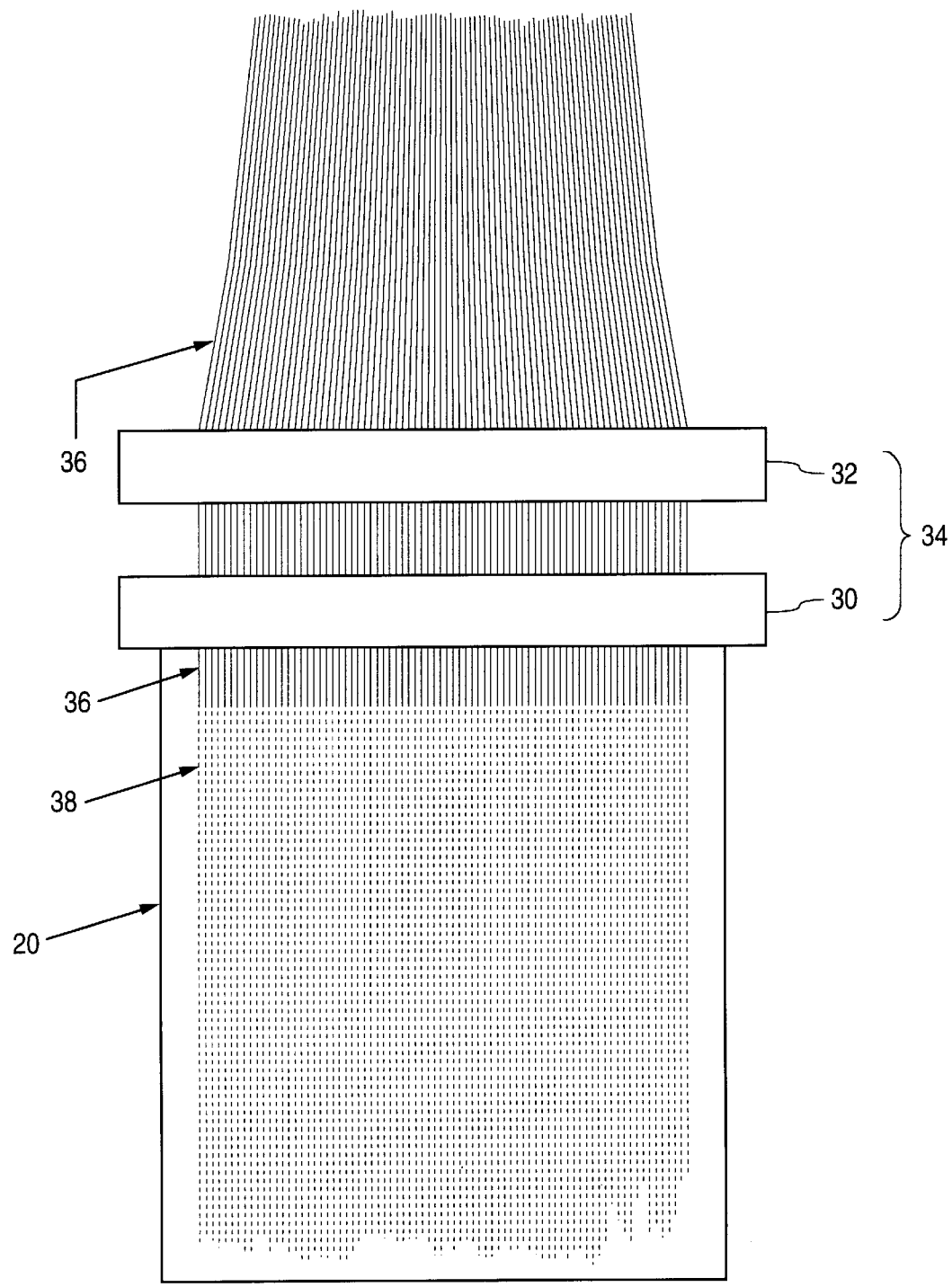
FIG. 2 is a sketch of fiber spacer used in a reactor according to the present invention.

Bottom spacer/lid 30 has dual functions: first, as a fiber spacer separating individual fibers from each other and maintaining the fibers in a stationary position and, second, as a lid to the reaction vessel. Some spacing between individual fibers is generally desirable to minimize the interfiber contact that can promote $TiO_2$ coating delamination. Therefore, bottom spacer/lid 30 has through holes 40, 42 through which fibers pass. Bottom spacer/lid 30 may be used in conjunction with an overlying top spacer 32 to form a two-component fiber spacer unit 34, as shown in FIG. 2. Fibers pass through holes 40, 42 in top spacer 32 (FIGS. 4a and 4b) and bottom spacer/lid 30 (FIGS. 3a and 3b) into reaction vessel 20. Top spacer 32 is optional where bottom spacer/lid is sufficiently thick to maintain the desired seal for the reaction vessel and to adequately separate and immobilize the fibers passing through it. Top spacer 32 can be spaced from bottom spacer/lid 30 to maintain or increase fiber spacing.

The lip of reaction vessel 20 fits into circular groove 38 in bottom spacer/lid 30 to seal off the reaction vessel during the catalytic process.

Figure 3A:
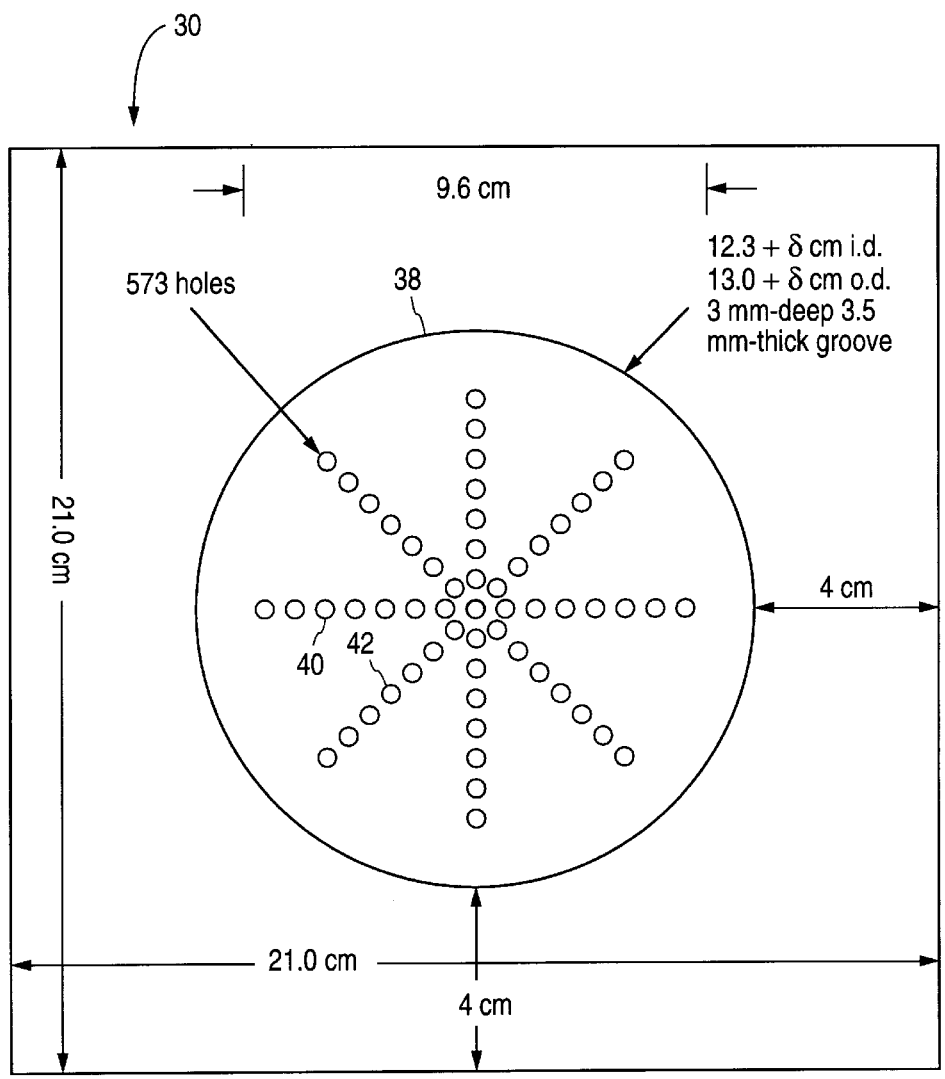
FIGS. 3a and 3b illustrate a plan view and side view, respectively, of the bottom spacer/lid as used in a reactor according to one embodiment of the present invention.
Figure 3B:
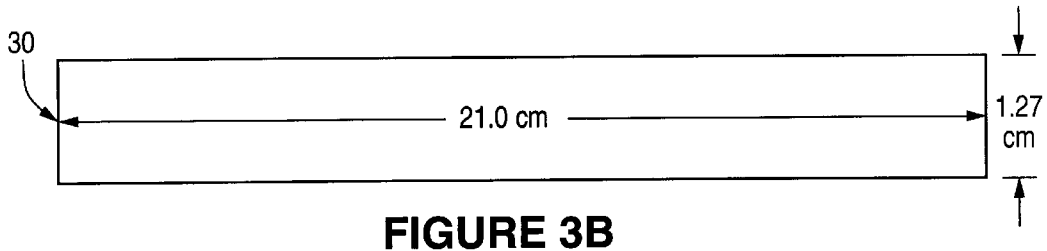
Figure 4A:
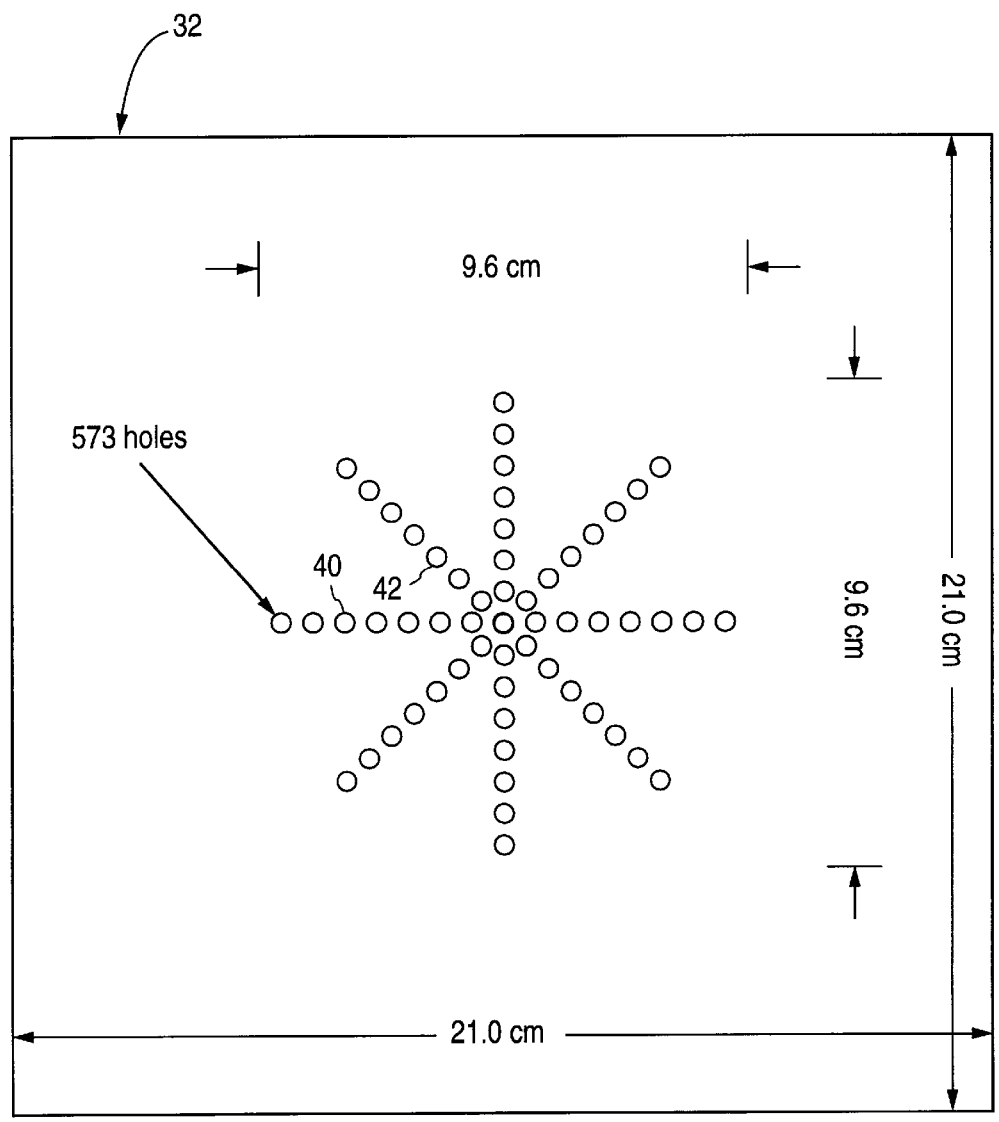
FIGS. 4a and 4b illustrate a plan view and a side view, respectively, of the top spacer as used in a reactor according to one embodiment of the present invention.
Figure 4B:
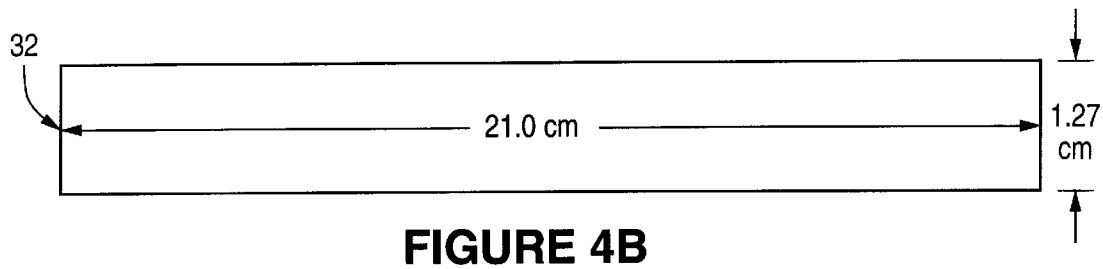

FIGS. 3a, 3b, 4a, 4b and 5 show exemplary dimensions, hole pattern and groove dimensions for bottom spacer/lid 30 and top spacer 32. FIGS. 3a and 4a show the spacers to be squares, although the spacers may be any of a number of geometric shapes. Bottom spacer/lid 30 has groove 38 encircling holes 40, 42 through which fibers 18 pass. The hole pattern of top spacer 32 matches that of bottom spacer/lid 30, but no groove is necessary. Generally, holes 40, 42 have a diameter that is larger than that of the fibers. However, holes 40, 42 can be of small enough diameter to secure the fibers in place and to ensure a gas-tight seal for the reaction vessel.

Figure 5:
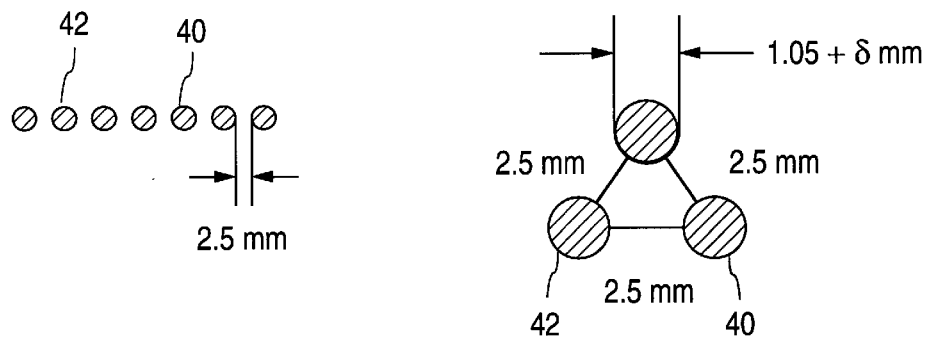
FIG. 5 shows an enlarged view of hole-to-hole spacing and hole pattern in a spacer used in a reactor according to one embodiment of the present invention.

Typical dimensions for 21.0 cm×21.0 cm×1.27 cm spacers made from polypropylene are groove diameter of 9.6 cm, 3 mm deep groove with 12.3+δ cm (inner diameter) and 13.0+δ cm (outer diameter). Each spacer has 573 holes. As shown in FIG. 5, holes are 1.05+δ mm in diameter and adjacent holes are separated by 2.5 mm. As one of ordinary skill will recognize, the number of holes, hole-to-hole spacing, hole pattern and material selection can vary widely depending on the number of fibers, fiber diameter, nature of reaction and whether a gas-tight reactor seal is needed. As shown in FIG. 12, an increase in fiber number density decreases the light flux per individual fiber.

A fiber spacer unit according to these dimensions may be constructed from a single block of polypropylene or other material, e.g., PTFE, about 6.35 cm×6.35 cm×2.5 cm. Holes for threading the fibers through may be drilled through the block in concentric circles about 1.5 mm apart. The block may then be cut in half into two identical sections. Once the fibers are threaded through both top spacer and bottom spacer/lid, the two spacers may be pulled apart, e.g., 2.5 cm. Such a separation of the spacers increases the "parallelness" of the fibers in the reactor.

For quartz fibers, a portion 36 of the fibers' length is used in the present invention as commercially available, i.e., without stripping the buffer and cladding from the fiber, while another portion 38, stripped of its protective buffer and cladding material to expose the fiber core, is coated with a photocatalyst coating. The unstripped portion 36 forms a "noncatalytic portion" and the stripped/catalyst coated portion 38 forms a "catalytic" portion. Noncatalytic portion 36 extends from bundle positioner 14 through bottom spacer/lid 30 and top spacer 32, where present, and terminates in the reactor vessel. All of the catalytic portion 38 is contained in the reaction vessel.

During reactor operation, the noncatalytic portion 36 transmits and focuses light from source 12 to the "catalytic" portion 38 of the fibers. Typical lengths for the catalytic portion range from 20 cm to 60 cm, while the length of the noncatalytic portion can be very long to permit great separation between the light source and the reactor without deleterious effects on reactor efficiency.

Generally, a three-step process of dipping, air-drying, and heat treatment may be used to coat quartz optical fibers. Initial bonding of a mono-layer of $TiO_2$ particles to the quartz substrate is primarily due to electrostatic interactions, as reported by Xu, et al., *J. Mat. Res.,* 1991, 6, 1073, and by Hu, et al., *Thin Solid Films,* 1992, 219, 18, both of which are incorporated herein in their entireties by reference. Hydrated quartz and $TiO_2$ (such as that commercially available from Degussa Company as P25) are amphoteric with $pH_{zpc}$'s of 2 and 6.6, respectively.

The coating solution generally is $TiO_2$ in a solvent, taking the form, for example, of a suspension. Suitable solvents may be aqueous or organic, such as water (thereby forming a hydrosol) or ethanol.

In one embodiment, the fiber bundle consists of 72 1-mm quartz optical fibers (commercially available as Power-Core FF-1.0-UMT fibers from 3M Company). A 20-cm length of the fibers was stripped down to the quartz core. The stripped fibers were bundled and polished by Fiberoptic Systems Inc., Simi Valley, Calif. A [227 mL (25 cm×3.4 (diam.) cm)] cylindrical reactor vessel was constructed from glass (such as that commercially available under the trade name PYREX) with a glass frit (fine) and bottom gas inlet for the introduction of air or oxygen. Sample ports 22, 24 at the top and bottom of the vessel were fitted with TEFLON™-coated septum screw caps. Bottom spacer/lid 30 and top spacer 32 were constructed from a TEFLON™ material with a 2 mm-deep groove fitting over the reactor vessel. Holes in the lid separating and positioning the fibers were concentrically arranged at a spacing of 1.5 mm. The fiber bundle ran coaxially with the reaction vessel.

The fibers' length 34 that supports the photocatalyst for the desired reaction in the FOCR was coated with the photocatalyst. Generally, the coating was applied by inverting the bundle and pipetting the coating solution down over the stripped portion of the fibers to the tips of the fibers. After air drying, the coated portion was inserted vertically into an open-ended tube furnace and fired at 300° C. for one hour. The coated length was differentially fired from a peak temperature of 110° C. at the secured end to about 300° C. at the free end.

In a preferred embodiment, an aqueous slurry of $TiO_2$ (Degussa P25) photocatalyst is used to coat the optical fibers. P25 consists of 50 nm average-diameter crystals agglomerated up to 1 $\mu$m in size and is an 80/20 mixture of the anatase and rutile phases.

Various concentrations of the slurry, ranging from 1 to 17 wt % (10–200 g P25 per liter water), were prepared. Some delamination of the coating was observed for the 17 wt % coating, suggesting a limiting thickness for the coating method employed. The delamination did not appear to affect the measured absorbed light flux or the degradation efficiency for the duration of the experiment. No delamination was observed for the 13 wt % coatings tested except at extreme pH (e.g., pH<3 and pH>11) and higher ionic strength conditions.

Coating thickness (0.5 to 10 $\mu$m) was positively correlated with the slurry $TiO_2$ content and overall chemical efficiency (rate of degradation per units light flux (power input) into the reactor). However, only a trace amount of coating is needed to effect pollutant degradation. In one test carried out after a $TiO_2$ coating, prepared from a 5 wt % sol, had been removed by overnight submersion in an ultrasonic bath, "cleaned" fibers achieved 50% degradation of 4-CP compared to 95% degradation for coated fibers over the same time period. (Cleaning of the fibers is accelerated by immersing the fibers in an acidic (pH<3) or basic solution (pH>12) and sonicating in an ultrasound bath.)

Effect of pH and Ionic Strength

Although a given chemical species has an inherent affinity for the $TiO_2$ photocatalytic coating, the interaction between the coating and the chemical species in solution may be greatly affected by their respective charges. This charge-dependent interaction is referred to as an electrostatic interaction. If the coating surface and the chemical species have the same charge, the chemical species is repelled from the surface, inhibiting adsorption to the surface required for degradation of the chemical species. With opposite charges, the chemical species will be attracted to the coating and adsorption is enhanced. The overall affinity is the net result of the inherent and electrostatic interactions.

pH affects the charge on and stability of the surface of the photocatalytic coating. Ionic strength, a measure of the concentration of charged species in solution weighted by their charges, characterizes the degree of influence of electrostatic forces on species interaction. The presence of higher concentrations of ions, or higher ionic strength, reduces the electrostatic effects by "insulating" the charges.

The $TiO_2$ coating surface carries a net positive charge for a solution pH lower than about 6.8, the point of zero charge for Degussa P25 $TiO_2$. Above pH 6.8, the coating surface carries a net negative charge. A pH of 6.8 is the point at which the surface has a net neutral charge, i.e., the positively charged ($TiOH_2^+$), negatively charged ($TiO^-$), and neutral (TiOH) surface species, are balanced. The higher or lower the pH is relative to 6.8, the higher the corresponding surface charge density (charge per unit area). The pH may also affect the charge on a chemical species in solution if the species can be characterized as an acid or base. If the pH is lower than the species' $pK_a$, then the species will carry a positive or neutral charge. At a pH higher than the species $pK_a$, the species has a neutral or negative charge.

Effect of Fiber Geometry and Composition

The length, diameter, number and composition of the fibers in a FOCR can affect light distribution in the system and, hence, reaction rate and efficiency.

Tests suggest that reducing the number of reflections a photon undergoes for a fixed length of coated portion of a fiber reduces the probability that the photon will impinge on a quartz-$TiO_2$ interface and the probability of the photon being refracted out of the fiber. Linear propagation along the fiber is extended, enabling activation of a greater surface area of photocatalyst. Thus, geometric considerations favor a relatively large diameter fiber since the number of reflections can be reduced either by increasing the incident angle, or increasing the fiber diameter, or both.

Selection of suitable fiber length for use in the present invention depends on the light propagation characteristics of the fiber. Lengths should be sufficient to allow absorption/radial loss of all the input light. For the conditions tested, a length of 20 cm was sufficient. However, the propagation distance may be extended if the incident angle is increased, a larger diameter fiber is employed, or the coating is more porous. Suitable fibers used in the FOCR are 1 mm diameter quartz optical fibers (commercially available as FT-1.0UMT from 3M Company) with a numerical aperture of 0.39.

However, relatively larger diameter fibers can be advantageous because of their stiffness, durability and ease of handling. Stiffness prevents fiber-to-fiber contact during reactor operation that can cause the coating to delaminate. Also, fibers with diameters of less than 0.8 mm may be secured at the ends to prevent the fibers from moving.

Numerical aperture, n.a., of a fiber dictates the minimum incident angle, or maximum acceptance angle, at which a light ray can enter the fiber and be propagated. (Incident angle is measured with respect to the perpendicular to the fiber wall.) Any light incident at a smaller angle will not be transmitted. A small n.a. indicates a small acceptance angle and vice versa. The fibers used have a n.a. of 0.39, corresponding to an acceptance angle of about 46°. Tests showed that a large incident angle, where light approached parallel to the fiber wall (e.g. $\theta_i=90°$) is preferred with respect to the chemical efficiency of the system (incident angles from 71° to 84° were tested). Thus, the n.a. constraint is not critical to reactor efficiency, but needs to be considered when configuring the light coupling section of the reactor.

The number of fibers in the fiber bundle determines the photocatalytic surface area and the intensity to which the photocatalyst is exposed for a given input intensity. The greater the photocatalytic surface area per unit reactor volume, the lower the mass transport limitations on the reaction. Also, fiber spacing affects the mass transport characteristics of the reactor. As an example, for a FOCR containing 72 fibers 20 cm in length and 1 mm in diameter and having a reaction solution volume of 190 mL and approximate surface area per unit reactor volume of 2.38 $cm^{-1}$, suitable fiber spacing was 1.5 mm in a concentric pattern with a 3 mm separation between the outer fibers and the reactor wall.

Fiber composition determines light transmission efficiency of the fiber. For uv radiation, quartz or sapphire fibers may be used. The OH content of the fiber core detracts from transmission at wavelengths <350 nm. Quartz fibers in the FOCR have a loss rate of 0.477 Db/m at 310 nm, where 3 Db represents a 50% power loss on a logarithmic scale. However, the relatively higher purity, lower OH content, fibers are more expensive. Some fibers in their commercially available form, e.g., the FP-1.0UHT (PCS) fiber from 3M Company, have a silicone resin cladding which leaves behind a silicone oil residue when the cladding is removed. This silicone residue inhibits bonding of the $TiO_2$ coating to the quartz fiber surface and therefore should be removed before the coating is applied. Preferred fibers are the FT-1.0UMT (TEX) fiber, the polymer cladding of which leaves no silicone residue and is easily removed with acetone.

Fiber-diameter Optimization

Experimental Procedure

Light from the UV source was focused into a single, 1 mm diameter quartz optical fiber (3M) at a minimum incident angle of $\theta_i=76°$ using a plano-convex quartz lens (Newport-Klinger Rolyn Optics). The fiber was stripped and coated at increasing lengths. At each length, uncoated total, coated total, and coated tip light flux measurements were made. The difference between the uncoated total and coated tip flux measurements was taken to be the input flux refracted out of the fiber. Fiber diameters of 400, 600, and 1000 µm and stripped lengths of 5, 10, and 15 cm were studied.

Results

The UV-light distribution down a single quartz fiber as a function of length for fiber diameters of 400, 600, and 1000 µm was determined. For a given fiber diameter, the amount of light remaining in the fiber decreases for each coating length. For a given coated fiber length, less light is transmitted down the fiber as the fiber diameter is decreased. For example, all of the light has been refracted out of the 400 µm fiber within the first 5 cm of coated fiber. While 11% and 14% of the initial light flux is transmitted further down the 600 and 1000 µm fibers, respectively. A small fraction of light is transmitted through the entire 15 cm coated sections for the 600 and 1000 µm diameter fibers.

Discussion

Enhancing the activated photocatalytic surface area of the coated fibers by maximizing light propagation down each fiber appears to result in an increased quantum efficiency for the OFR (as discussed in greater detail in the inventors' paper entitled "*Development and Optimization of a $TiO_2$-Coated Fiber Optic Cable Reactor: Photocatalytic Degradation of 4-Chlorophenol*" published in *Environ. Sci. Tech.*, 1995, Vol. 29, pp. 2974–2981, incorporated herein by reference in its entirety.) Light propagation down a single fiber was found to be extended by increasing the incident angle of light introduced into the fiber (i.e., to 90° relative to the normal to the fiber wall); optimizing the coating thickness so that it approaches 100% absorption of the refracted light (i.e., 4 or 5 times the inverse of the coating extinction coefficient); and minimizing the interfacial $SiO_2$—$TiO_2$ surface area.

As another possible mechanism for light propagation extension, we investigated the fiber thickness. As the fiber thickness is increased, photons undergo fewer reflections at the quartz-$TiO_2$ interface for a fixed incident angle and a given length. With a thicker diameter fiber, the probability that a photon will be refracted through the quartz-$TiO_2$ interface is reduced, and, thus, the light propagation down the fiber is extended.

If findings from our previous study reported in *Environ. Sci. Technol.* (identified above) are applied to an optimal fiber diameter, then the chemical efficiency will be enhanced in an OFR employing larger diameter fibers in the fiber cable.

Light Intensity Dependence

Experimental Procedure

Photooxidation of 4-chlorophenol (4-CP) was carried out to test the relationship between the incident light intensity in the OFR and the resulting quantum efficiency. The input light intensity was reduced to 37%, 10%, and 1% of the maximum using neutral density filters (Oriel Corp.) with $[4\text{-}CP]_o=100$ µM. In order to factor out concentration effects, photooxidation was allowed to take place until $[4\text{-}CP]_t=86$ µM. This concentration level was obtained after 1 hour of irradiation for the highest-intensity case. The 4-CP concentration was followed spectrophotometrically (Shimadzu UV-2101PQ and by HPLC (HP SeriesII 1090) at $\lambda=224$ and 280 nm. No changes in 4-CP concentration due to the volatilization of 4-CP or water evaporation were observed for a 100 µM solution that was sparged with $O_2$ for 30 hrs. in the dark.

Results

The apparent quantum efficiency for the photooxidation of 4-CP was determined as a function of absorbed light intensity. The quantum efficiency, is defined as the change in 4-CP concentration divided by the time to achieve a predetermined level of degradation multiplied by the absorbed light flux, $$\phi \equiv \frac{\frac{d[4-CP]}{dt}}{\frac{d([h\nu])_{abs}}{dt}} \cong \frac{([4-CP])_o - ([4-CP])_t}{t \cdot \frac{([h\nu])_{abs}}{dt}} \qquad (11)$$

Absorbed light intensities of 23.1±4.8, 9.0±2.1, 2.4±0.5, and 0.2±0.1 µEin (L-min)$^{-1}$ were measured. Irradiation times of 1, 2, 6, and 30 hours were required to achieve 14% degradation of 4-CP for the respective absorbed light intensities. These experiments yield quantum efficiencies of $\phi=0.010\pm0.002$, $\phi=0.013\pm0.002$, $\phi=0.019\pm0.005$, and $\phi=0.042\pm0.006$ for the decreasing absorbed light fluxes. A four-fold increase in the quantum efficiency was achieved for a two-order of magnitude reduction in the absorbed light intensity.

Discussion

Previous studies by others have shown an inverse relationship between the absorbed light flux and the quantum efficiency. In illuminated semiconductor photocatalysts, the charge-carrier recombination and interfacial charge transfer are second and first order processes, respectively. The charge-carrier density increases with an increase in the absorbed light intensity. As a result, at a high absorbed light intensity, the rate of charge-carrier recombination is increased relative to interfacial charge transfer and this leads to a lower relative quantum efficiency. However, a lower absorbed light flux yields slower overall reaction rates as the rate of charge pair generation becomes rate-determining. A unique feature of the OFR system is its ability to minimize the negative light intensity effects on φ while maintaining a high input light intensity necessary for rapid overall degradation. This optimization can be achieved readily by increasing the fiber number density in the fiber bundle as illustrated in FIG. 12. In this case, the same input photon flux can be divided among a larger number of fibers, and distributed over a greater photocatalytic surface area.

In order to test this hypothesis, in part, the input light intensity was successively reduced to 37%, 10%, and 1% of the maximum input value and the corresponding quantum efficiencies were determined. A four-fold increase in the quantum efficiency is achieved for a two-order of magnitude reduction in light intensity. The apparent quantum efficiency of $\phi=0.042$ (4.2%) for the aqueous-phase, photocatalytic oxidation of 4-chlorophenol on $TiO_2$ is high relative to previously reported values for slurry suspension reactors. In our study referred to above, we measured an average apparent quantum efficiency of $\phi=0.065$ for slurry-phase photooxidation of 4-CP at low light intensity (e.g., 7.6 $\mu EinL^{-1}$ $min^{-1}$) and a $TiO_2$ loading (Degussa P25) of 1 g-L$^{-1}$. Al-Sayyed et al., *J. Photochem. Photobiol. A: Chem.*, 1991, 58, 99–114 incorporated herein by reference, reported quantum efficiencies of $\phi=0.009$ and $\phi=0.013$ for light intensities of $10^{-2}$–$10^{-3}$ Ein L$^{-1}$ min$^{-1}$, respectively, and a $TiO_2$ loading (Degussa P25) of 2 g-L$^{-1}$. Thus, the relative quantum efficiency may be significantly enhanced in OFR systems without a net reduction in overall reaction rates. These results suggest that a large total light flux into an OFR system will result in rapid reaction rates since a high fiber number density will minimize the light intensity per individual fiber and thus allow the OFR to operate in the high $\phi$ domain.

Findings from the light distribution and efficiency experiments show that the system's efficiency can be enhanced by extending the linear light propagation down the coated fiber. This extension increases the photocatalytic surface area which is illuminated and thus, activated while also distributing the light intensity over a greater photocatalytic surface area. The former effect reduces mass transfer limitations to photochemical conversion because the activated surface area per unit volume of reaction surface is increased. The latter enables the system to be operated in a higher relative quantum efficiency domain, as described in the Light Dependence Section, above.

Several ways exist to extend linear light propagation. Increasing the incident angle of the input light will extend linear light propagation as discussed in Examples 2 and 3. Furthermore, in general, any method that reduces the interfacial contact area between the photocatalytic portion of the coating, i.e., the $TiO_2$ particles, and the fiber wall extends linear light propagation along the fiber. These methods include, for example, applying a coating containing large (e.g., greater than 1 micron) agglomerated $TiO_2$ particles, selectively stripping the fiber buffer and cladding and/or coating from a fiber, and incorporating a nonphotoactive filler material, such as activated carbon or silica, into the photocatalytic coating. Decreasing the concentration of $TiO_2$ in the hydrosol coating reduces not only interfacial contact area but also the resulting coating thickness, which was shown to reduce the chemical efficiency of the system.

Ionic Strength and pH Dependence

Experimental

Sample solutions (190 mL) of dichloroacetate (DCA) (Spectrum), and oxalate (Sigma) of varying initial concentrations, pH, and ionic strength (Table A) were prepared from stock solutions. Before irradiation, the coated-fiber bundle was immersed in the reaction solution and allowed to equilibrate for 30 min. Nylon (Nalgene 0.45 $\mu$m) or Teflon (Acrodisc 4CRPTFE 0.45 $\mu$m) syringe filters were used to filter all samples.

Chloride production was followed by chemical potentiometry using a Cl— specific electrode (Orion 9617BN, 1.0 M $NaNO_3$ matrix) and by ion chromatography (Dionex BIOLC 4500i Series). The pH was determined with a Radiometer PHM85 pH meter while constant pH was maintained with a pH-stat (Radiometer PHM85 pH meter, a Radiometer TTT80 Titrator, and a Radiometer ABU80 Autoburette). 4-CP and PCP and associated intermediates were analyzed spectrophotometrically and by HPLC ($\lambda$=224/280 and 224/250 nm, respectively). TOC was determined with a TOC analyzer (Shimadzu TOC5000). Oxalate and DCA were quantified by ion chromatography (Dionex BIOLC 4500i Series). Pure (Liquid Air) oxygen was used at saturation as the primary electron acceptor and to mix the reactor via continuous sparging, which was passed through an in-line gas purifier (Alltech 8132).

For the pH study, the oxidation rates for three 0.5 mM solutions of DCA and OX at pH 3, 5, 8, and 11 and pH 4.25, 5.25, 6.6, and 8, respectively, were measured. pH adjustments were made by the addition of $HNO_3$ or KOH using the pH stat system described above. For the ionic strength study, oxidation of a 100 $\mu$M 4-CP solution was carried out for ionic strengths of 0.005, 0.05, and 0.5 M $KNO_3$ at an initial, unadjusted pH of 5.5. Reaction rates were determined for a 2 hour irradiation period.

Results

The reaction conditions and results for the ionic strength and pH dependency experiments are given in Table A. No reduction in the reaction rate for the photooxidation of 4-CP was observed over the ionic strength range of 0.005 to 0.5 M $KNO_3$. The reaction rate was constant at 17.6±0.5 $\mu$M-hr$^{-1}$.

The photochemical oxidation of DCA is a function of pH. The observed photooxidation rate is the highest at pH 3 and decreases progressively to zero at pH>8.

A strong, discrete $TiO_2$ dependence for the photooxidation of $C_2O_4^{2-}$ (0.5 mM) was complete within 2.5 hrs. with $-d[OX]/dt=0.2$ mM hr.$^{-1}$. However, when the pH range was increased slightly to 5.0–5.5, the initial rate of photodegradation of a 0.5 mM solution was reduced to 0.16 mM hr.$^{-1}$.

The pH and ionic strength conditions also had an affect on the stability of the $TiO_2$ coating. During irradiation of reaction solutions of 0.5 M ionic strength, pH3 and pH11, the reaction solution became slightly cloudy indicative of partial delamination of the coating. At pH values below 3 and above 11 (results not given), the coating was significantly affected.

TABLE A

Reaction conditions, initial rates and relative quantum efficiencies, $\phi$, for photooxidations of 4-CP, PCP, DCA, and OX. The solution pH was unadjusted and an incident angle of light into the fiber bundle of $\theta_i = 76°$ was used unless otherwise noted.

| Substrate | $\mu$ (M) | pH$_o$ | [C]$_i$ (mM) | I$_{abs}$ ($\mu$EinL$^{-1}$ min$^{-1}$) | Initial Rate (mM hr$^{-1}$) | $\phi$ |
|---|---|---|---|---|---|---|
| Ionic Strength | | | | | | |
| 4-CP | 0.005 | 5.5 | 0.100 | 6.1 | 18.0 × 10$^{-3}$ | 0.009 |
| 4-CP | 0.05 | 5.5 | 0.100 | 6.1 | 17.0 × 10$^{-3}$ | 0.009 |
| 4-CP | 0.5 | 5.5 | 0.100 | 6.1 | 17.8 × 10$^{-3}$ | 0.009 |

TABLE A-continued

Reaction conditions, initial rates and relative quantum efficiencies, φ, for photooxidations of 4-CP, PCP, DCA, and OX. The solution pH was unadjusted and an incident angle of light into the fiber bundle of $\theta_i = 76°$ was used unless otherwise noted.

| Substrate | $\mu$ (M) | pH$_o$ | [C]$_i$ (mM) | I$_{abs}$ ($\mu$EinL$^{-1}$ min$^{-1}$) | Initial Rate (mM hr$^{-1}$) | φ |
|---|---|---|---|---|---|---|
| pH | | | | | | |
| DCA | 0.001 | 3.0 | 0.5 | 5.7 | 0.11 | 0.061 |
| DCA | 0.001 | pH$_{stat}$ 5.0 | 0.5 | 5.8 | 0.08 | 0.044 |
| DCA | 0.001 | pH$_{stat}$ 8.0 | 0.5 | 6.0 | 0.0 | 0.0 |
| DCA | 0.003 | pH$_{stat}$ 11.0 | 0.5 | 5.8 | 0.0 | 0.0 |
| OX | 0.0005 | pH$_{stat}$ 4.25 | 0.5 | 9.3 | 0.20 | 0.034 |
| OX | 0.0005 | 5.25 | 0.5 | 9.3 | 0.16 | 0.028 |
| OX | 0.0005 | 6.6 | 0.5 | 9.3 | 0.04 | 0.007 |
| OX | 0.0005 | pH$_{stat}$ 8 | 0.5 | 9.3 | 0.01 | 0.001 |
| Kinetics & Stoichiometry | | pH$_{stat}$ | | | | |
| 4-CP | — | 5.5 | 0.100 | 5.3 ($\theta_i = 84°$) | 17.5 × 10$^{-3}$ | 0.010 |
| PCP | — | 5.5–6.0 pH$_{stat}$ | 0.062 | 3.9 ($\theta_i = 84°$) | 18.5 × 10$^{-3}$ | 0.015 |
| DCA | 0.001 | 3.0 | 1.0 | 4.2 ($\theta_i = 84°$) | 0.125 | 0.095 |
| OX | 0.0005 | 4.5–5.0 pH$_{stat}$ | 0.5 | 6.6 | 0.35 | 0.017 |
| Incident Angle ($\theta_i$) | | | | | | |
| DCA | 0.001 | 3.0 | 1.0 | 7.0 | 0.15 | 0.070 |
| DCA | 0.001 | 3.0 | 1.0 | 4.2 ($\theta_i = 84°$) | 0.125 | 0.095 |

Discussion

The pH and ionic strength of contaminated waste streams are highly variable. These solution characteristics can influence the speciation of compounds, the nature and magnitude of electrostatic interactions at the semiconductor photocatalyst (metal oxide) surface, and the competition for reactive surface sites. Variations in pH, $\mu$, and T have demonstrable effects on the oxidation rates measured in TiO$_2$/UV systems. In the OFR, the oxidation rates of both DCA and oxalate were investigated and found to be highly dependent on pH. Oxalate (pK$_{a2}$=1.2; pK$_{a1}$=4.0) and DCA (pK$_a$=1.5) have been found to form inner sphere surface complexes with TiO$_2$ at low pH values. The reaction rates are highest in the pH region where the substrate and TiO$_2$ surface are oppositely charged. As the pH approaches the pH$_{zpc}$ of TiO$_2$, 6.8, the repulsive forces between the negatively charged TiO$_2$ surface and substrate (e.g., ClCH$_2$CO$_2^-$) overcome the tendency toward inner-sphere complexation with a resulting loss of photoreactivity. However, in the case of 4-CP, ionic strength did not influence the observed oxidation rate since 4-CP has weak inner-sphere and electrostatic interactions at low pH with the TiO$_2$ surface, as reported by Al-Sayyed, et al. Therefore, the influence of increasing ionic strength on the spatial extent of the electrical double-layer does not affect the oxidation rates of 4-CP at low pH.

The observed partial delamination of the coating at the highest ionic strength, 0.5 M and at pH values below pH 3 and above pH 11, suggests that repulsive electrostatic forces cause destabilization of the coating. At these pH values and ionic strength, the net charge on the TiO$_2$ particles is either quite positive or negative relative to more neutral pH values and lower ionic strengths as given in Table 2, as reported by Martin, et al. in the paper submitted in November 1995 to *Environ. Sci. Technol.* These conditions may produce a repulsive force sufficient to cleave TiO$_2$ particles from the α-SiO$_2$ surface. At high ionic strengths the electrical double-layer would be compressed supporting a higher surface charge density at the same pH allowing the coating to destabilize.

EXAMPLE 1

Application of TiO$_2$ Coating

Three mm diameter quartz rods (commercially available from GM Associates, Inc.) and 1 mm diameter quartz optical fibers (3M's Power-Core FT-1.0UMT) were used as substrates for the photocatalyst coating. Suspensions of TiO$_2$ (Degussa P25) in purified water (Milli-Q, 18 MΩ) were prepared and dispersed by sonication (Branson Model 5200) and stirring to form TiO$_2$ suspensions ("hydrosol") of 0.05, 0.1, 1, 5, 9, and 17 wt %. The pH of the coating hydrosol was 5.5. A length of optical fiber was completely stripped of its protective buffer and cladding using a wire stripper and acetone to expose the quartz core.

A dip coating method was employed because of the geometry of the optical fiber substrate. Ten cm sections of the quartz rods or fibers were dipped into the stirred TiO$_2$ hydrosol suspension and then air dried for 24 hours. Selected TiO$_2$-coated rods and fibers were fired in a high-temperature furnace (Lindberg Moldatherm Model 55322) at 200° C. or 500° C. for 1 hour. Second and third coatings were achieved by air-drying between dippings, followed by a final firing.

The heat-treated samples were cut into 3–5 mm lengths for analysis by scanning electron microscope (SEM) (Camscan Series 2), using secondary electrons and back-scattered electron images, and gold-coated using a standard vacuum evaporation procedure. Maximum, minimum and average thickness were recorded for each sample.

From the SEM analyses, it appears that the sintering temperature had no discernible effect on the resulting coating thickness. Also, no multiple-coating layering effects are evident, although distinct agglomerated particles and some clumping were observed.

As shown in Table B, below, for 1, 5, 9, and 17 wt % multiple coating samples, very little increase in thickness is apparent for a second and third coating, within the resolution of the analysis. The large variation in thickness observed for the multi-coating samples may be attributable to excessive clumping and fragmentation of the coating during sample preparation.

TABLE B

| Sol TiO$_2$ Content (wt %) | Number of Coats | TiO$_2$ Layer Thickness ($\mu$m) |
|---|---|---|
| 0.05 | 1 | 0.8 |
| 0.1 | | 0.5 |
| 1.0 | | 1.8 |
| 1.25 | | 1.5 |
| 5.0 | | 2.0 |
| 1.0 | 2 | 2.0 |
| 5.0 | | 2.3 |
| 9.0 | | 1.8 |
| 17.0 | | 6.0 |
| 1.0 | 3 | 2.0 |
| 5.0 | | 3.3 |

TABLE B-continued

| Sol TiO$_2$ Content (wt %) | Number of Coats | TiO$_2$ Layer Thickness ($\mu$m) |
|---|---|---|
| 9.0 | | 2.0 |
| 17 | | 7.0 |

Information about the thickness, porosity and pore size of the TiO$_2$ coatings is important for interpreting the results of the single-fiber light distribution and 4-CP oxidation efficiency experiments. According to 1990 Degussa Technical Bulletin No. 56 and the literature, TiO$_2$ used in this study, is synthesized by a gas-phase, high temperature process and composed of an 80/20 mixture of anatase and rutile phases, respectively. Crystal sizes average about 20 nm and specific surface area is 50 m$^2$/g. The general crystal structure is believed to have a plate-like morphology. These crystals, in an agglomerated state having characteristic lengths averaging 1 $\mu$m, form the resulting coating matrix. It may be for this reason that minimum thicknesses of only 0.5 $\mu$m were observed for even very dilute sols, assuming the 1 $\mu$m dimension of the agglomerated particle is the larger one. However, determination of the effect of sol TiO$_2$ content on the interfacial coverage was not possible using SEM analysis.

The fraction of refracted light absorbed by the photocatalyst coating should increase as the thickness of the coating increases, following from Beer's Law:

$$\frac{I_{absorbed}}{I_{interface}} = (1 - e^{-\epsilon\delta}) \quad (12)$$

where $\epsilon$ and $\delta$ are the extinction coefficient and thickness of the coating, respectively. The extinction coefficient for solid state TiO$_2$ is 0.006 nm$^{-1}$. Since the TiO$_2$ coatings on the quartz fibers is porous, we assume that the effective extinction coefficient is $\leq$0.006 nm-$^{-1}$.

The 5 and 17 wt % coatings are approximately 2 and 5 $\mu$m thick with absorption efficiencies of 45 and 95%, respectively. Based on Eq. 12, corresponding extinction coefficients of 0.0006 and 0.0003 nm$^{-1}$ are calculated. Aguado, et al. estimated average coefficients ranging from 0.0006 to 0.001 nm-$^{-1}$ for coatings comprised of nano-sized crystallites derived from various TiO$_2$ sols. Since quantitative correlation of the sol concentration with the resulting coating thickness were not possible, quantitative estimations of coating porosity and extinction coefficients are not possible. Therefore, in the analyses described here, sol TiO$_2$ concentration was used as an indirect measure of thickness as suggested by the work of Xu, et al. and Hu, et al.

These analyses are discussed in greater detail in the inventors' paper entitled "*Development and Optimization of a TiO$_2$-Coated Fiber Optic Cable Reactor: Photocatalytic Degradation of 4-Chlorophenol*" published in *Environ. Sci. Tech.*, 1995, Vol. 29, pp. 2974–2981, incorporated herein by reference in its entirety.

EXAMPLE 2

Light Distribution in a Fiber

Advantageous operation of the FOCR system of FIG. 1 is facilitated with an understanding of the dependence of radial light transmission on the angle of incidence and thickness and interfacial coverage of the TiO$_2$ coating was determined. The objective was to provide sufficient illumination of the TiO$_2$ coating to achieve photo-activation while maximizing the axial extent of light propagation, which in turn maximizes the activated surface area.

Input and absorbed light intensities for single fiber and fiber bundle experiments were measured by chemical actinometry using $\alpha$-(2,5-dimethyl-3-furylethylidene) (isopropylidene) succinic anhydride (Aberchrome 540), according to the method of Heller and Langan reported at *J. Chem. Soc. Perkin Trans.*, 1981, 2, 341.

Figure 6:
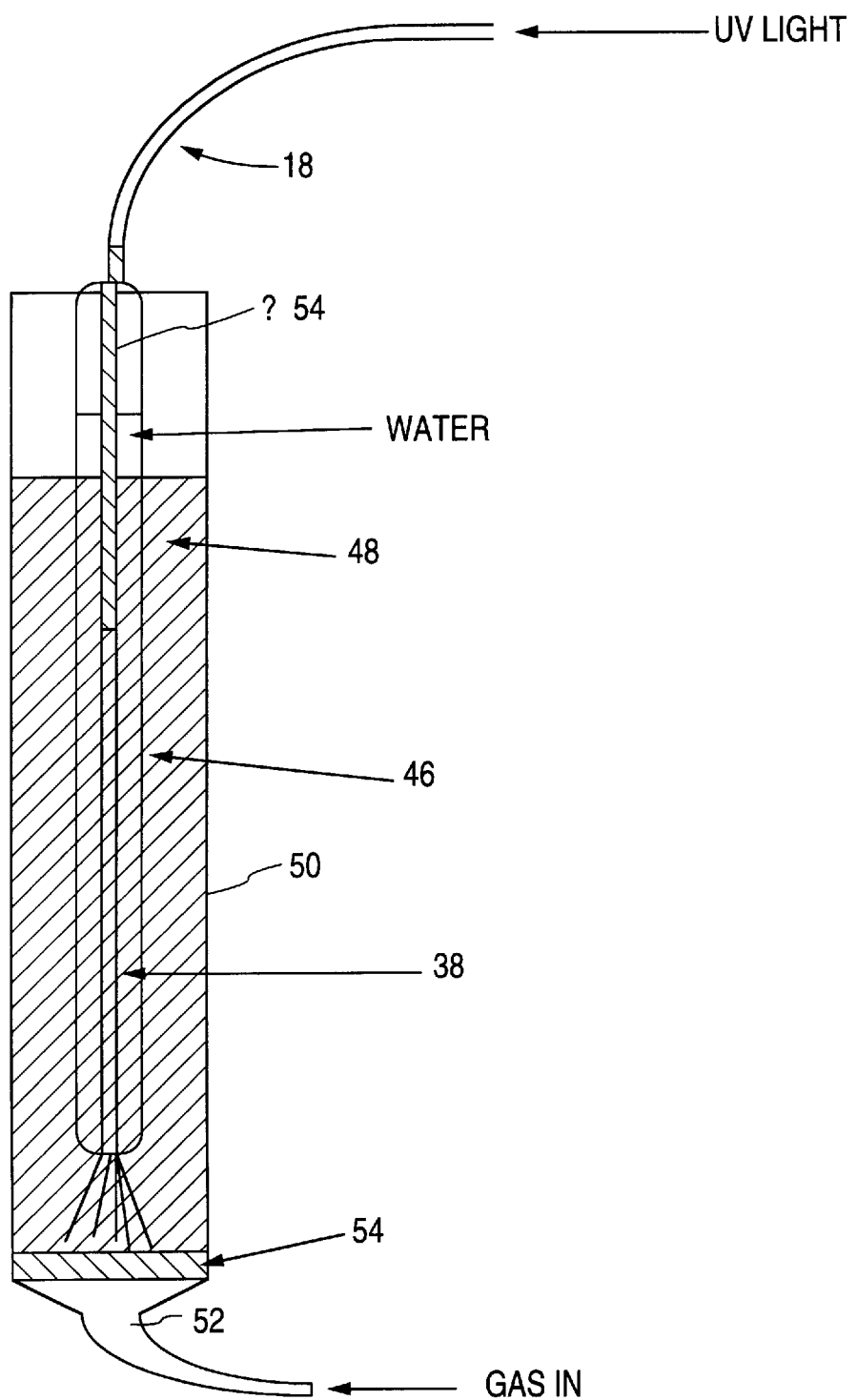
FIG. 6 is a sketch of an actinometry experimental set up.

The experimental set up shown in FIG. 6, includes a distilled water-filled quartz tube 46 suspended in actinometry solution 48 contained in a glass jacket 50. A gas inlet 52 introduces gas, e.g., nitrogen, to enhance mixing of the actinometry solution via a glass frit 54. The length of a fiber 18 has a stripped and TiO$_2$-coated portion 38 and an unstripped portion 36. A light source (not shown) provides radiation, e.g., uv, for the light distribution determination. Light is propagated along the unstripped portion to the stripped/coated portion. In order to prevent photocatalytic oxidation of the anhydride, the TiO$_2$-coated portion of the fibers was separated from the actinometry solution by the quartz tube.

To prepare the fibers, a section of the optical fiber was stripped and coated, as described above, at increasing lengths. The coatings were completely removed by wiping the fiber with a damp cloth. Because it was necessary to measure the light fluxes without decoupling the fiber from the light source, the fiber coating was not fired. However, a heat gun was used to dry the coated fibers at 100° C.

Stripped lengths of 1, 2, 5, 10 and 15 cm, sol TiO$_2$ contents of 1, 5, 7, 9 and 17 wt %, and minimum incident angles of 71°, 76° and 84° were studied. At each length and for each coating suspension concentration, total and tip flux measurements were made of the uncoated and coated fibers. Tip flux was determined by masking the coated fiber with TEFLON™ tape. The difference between the measurements of total flux for each coated length and flux from the tip was taken to be the radial light not absorbed by the TiO$_2$ coating.

Input light intensities were a function of the focusing lens used and the corresponding coupling efficiency of the light beam to the fiber or face of the fiber bundle. Light distribution along a single fiber was determined as a function of minimum incident angle and hydrosol TiO$_2$ content, the latter used as an indirect indication of coating thickness. Input light fluxes varied with minimum incident angle.

Figure 7:
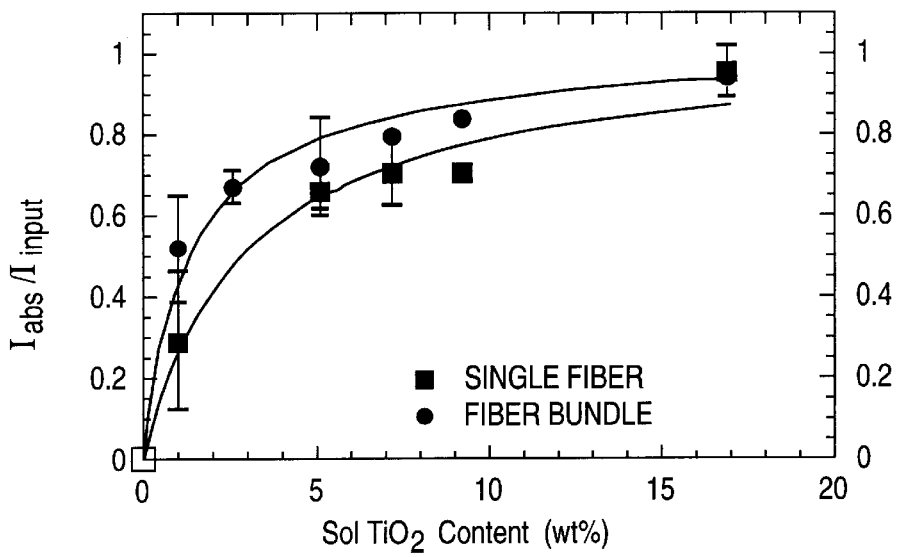
FIG. 7 is a graph showing $TiO_2$ coating absorption efficiency as a function of the sol $TiO_2$ content for 10 and 15 cm stripped lengths.

FIG. 7 shows absorption efficiency (ratio of light absorbed by the TiO$_2$ layer to input light) as a function of the sol TiO$_2$ content for 10 and 15 cm stripped lengths for both single fibers and fiber bundles. At these lengths, less than 5% of the input light propagated through the fiber tip. The fraction of input light absorbed by the TiO$_2$ increased with increasing sol TiO$_2$ content. The absorbed fraction was greater than 60% for all but the 1 wt % sol coating (which absorbed about 30%), and the 17 wt % sol coatings for which the absorbed fraction approaches 100%.

The bundle absorption efficiency is consistently higher than the single-fiber absorption efficiency for each coating sol. This may be due in part to a secondary effect of "leaking" refracted light being absorbed by a neighboring coated fiber. With this in mind, it appears that the overall light absorption efficiency of the bundled array is a function of both the fiber coating characteristics and the density of fibers in the array.

Figure 8A:
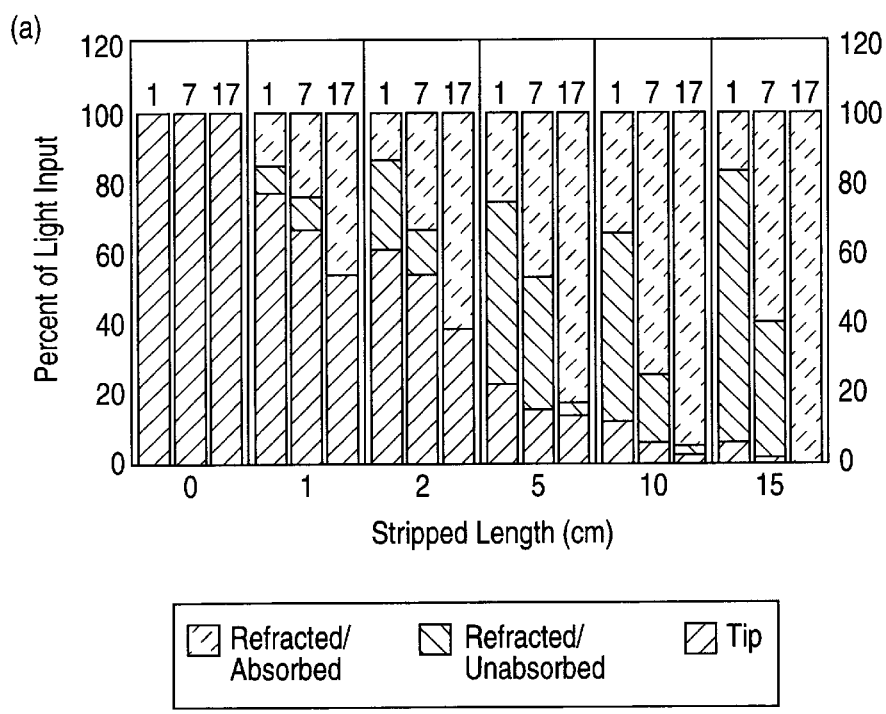
FIG. 8a is a bar graph showing light distribution using a fixed minimum incident angle of 76° as a function of the length of a $TiO_2$-coated segment for sols of 1, 7, and 17 wt % $TiO_2$.

FIG. 8*a* shows light distribution using a fixed minimum incident angle of 76° as a function of the length of a TiO$_2$-coated segment for sols of 1, 7 and 17 wt % TiO$_2$. Measurements taken at increments along stripped lengths simulate the light distribution along the fiber. Before the fiber was stripped, all the light emanated from the tip since no radial fluxes were detected for uncoated stripped lengths. As expected, for stripped and coated fibers of greater lengths, more light was refracted as the quartz-TiO$_2$ interfacial area increased. For a 2 cm stripped length, radial fluxes were at least 40% for each coating sol. At a stripped length of 10 cm, more than 95% of the light was refracted for the 7 wt % and 17 wt % sol coatings. At each stripped length, the portion of refracted light absorbed by the TiO$_2$ layer increased with increasing sol TiO$_2$ content. This result is consistent with the absorption efficiency findings. A single coat from the 17 wt % coating sol provided sufficient thickness to absorb more than 95% of the refracted light.

For a given stripped/coated length, refraction also increased with increasing sol TiO$_2$ content. Increases from 10 to 90% were observed and were higher for shorter stripped/coated lengths.

Figure 8B:
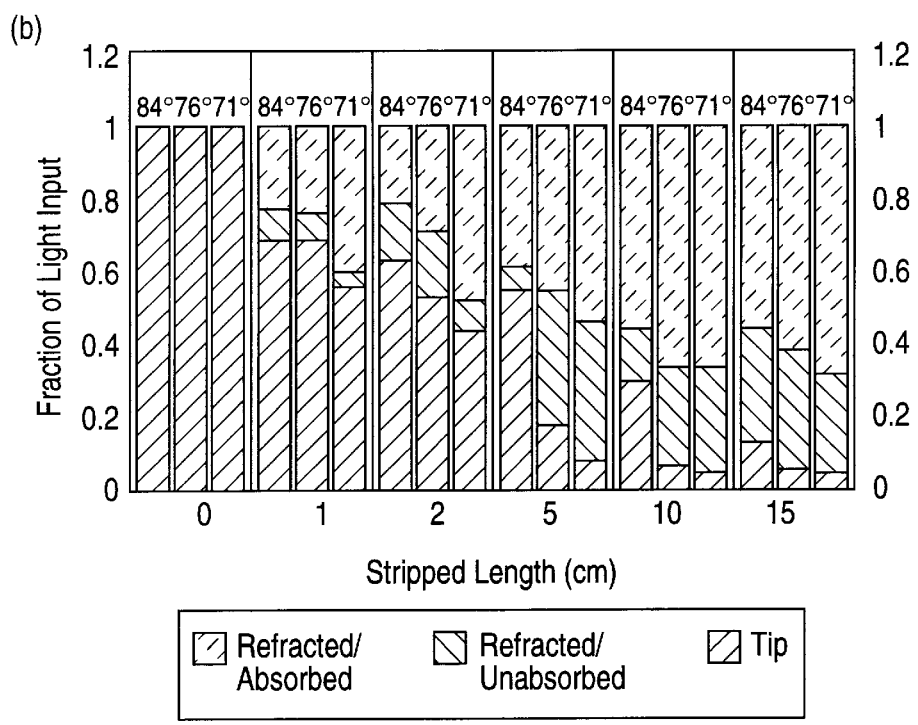
FIG. 8b is a bar graph showing light distribution as a function of stripped length for minimum incident angles of 71°, 76° and 84° for coatings prepared from a 5 wt % sol.

FIG. 8b shows light distribution as a function of stripped and coated fiber length for minimum incident angles of 71°, 76° and 84°. A 1000W Xe arc lamp (Oriel Model 6269) was used as a UV radiation source. Light was filtered through a 10-cm IR water filter and a UV band pass filter (310–370 nm) and focused into the optical fiber using one of three plano-convex quartz lenses of varying focal lengths (Newport-Klinger Rolyn Optics). The coating was prepared from a 5 wt % sol.

As can be seen from FIGS. 8a and 8b, as the minimum incident angle approached 90° (i.e., parallel to the TiO$_2$ layer-quartz core interface), the degree of refraction, absorbed and penetrated, decreased for each stripped length. As the focal length of the light input increased, minimum incident angle increased.

FIGS. 7, 8a and 8b show light distribution within a single coated fiber as a function of coating thickness and interfacial coverage of the coating and the incident angle of the input light. As seen in FIG. 7, thicker coatings derived from coatings prepared from higher TiO$_2$ content sols absorbed more refracted light. However, as a general guideline, suitable coating thickness, with respect to photo-activation of the coating, may be taken to be a multiple of the inverse of extinction coefficient $\epsilon$ of the coating.

Detection of light through the TiO$_2$ coating demonstrated that sufficient light was refracted out of the fiber, penetrating and activating the coating. Coatings prepared from the 17 wt % sol appeared to approach the penetration limit of the refracted light. Results from the single fiber light distribution experiments (FIGS. 8a and 8b) confirm that the effective refractive index of the TiO$_2$ coating was greater than that of the quartz fiber core. Light energy appeared to be transmitted to the TiO$_2$ coating primarily via radial refraction. Increases in refraction with increases in the sol TiO$_2$ content suggest that the composite refractive index of the interface of the TiO$_2$ matrix and the quartz core increases with the coating sol TiO$_2$ concentration. Degree of coverage at the interface appeared to increase as the TiO$_2$ content of the sol increased, resulting in enhanced refraction. With increasing interfacial coverage, the probability of an incident photon being refracted out of the quartz fiber increases. Increasing the minimum incident angle from 71° to 84° resulted in 10 to 60% reductions in refraction. This trend is theoretically predicted by the Fresnel equations for incident angles greater than the Brewster angle. Also, geometrically, a light wave will undergo fewer reflections for a given length at larger incident angles. As a consequence, light was distributed more uniformly over and propagated further along the fiber, thereby increasing the activated surface area of the photocatalyst.

It has been demonstrated that energy transmission to the TiO$_2$ coating via refraction in a single coated fiber can be controlled by adjusting the thickness and interfacial coverage of the coating and the angle of incidence of the input light. Minimal interfacial photocatalyst coverage and a large incident angle approaching 90° serve to minimize refraction per reflection and the number of reflections for a given length of fiber, thereby increasing the activated photocatalytic surface area. Coating thicknesses approaching four or five times $\epsilon^{-1}$ maximize the absorption efficiency of the refracted light and the activated surface area. With the coating technique of the present invention, an increase in the coating thickness also increased the TiO$_2$ interfacial coverage. It is contemplated that starting with a suspension solution pH that is greater than the pH$_{zpc}$'s of both quartz and TiO$_2$ (e.g., pH 8 or 9) may minimize the interfacial coverage. (From our studies to date, interfacial coverage of no more than 30% is preferred.) This may, however, affect the stability of the coating.

EXAMPLE 3

Oxidation of 4-Chlorophenol

A 190 mL, 0.1 mM solution of 4-CP was prepared from a 1.0 mM stock solution (Aldrich, 99+%). Chloride ion production during the course of oxidation was followed with a chloride ion-selective electrode (Orion 961713N, 1.0 M NaNO$_3$ matrix) and by ion chromatography (Dionex BIOLC 4500i Series). The pH was determined with a Radiometer PHM85 pH meter. Disappearance of 4-CP was followed spectrophotometrically at $\lambda$=224 nm and 280 nm (Shimadzu Model UV-2101PC and Hewlett Packard's HP8451A Diode Array) and by HPLC (Hewlett Packard's HP Series II Model 1090). Oxygen was used to saturate the reaction solution and to ensure proper mixing. An in-line gas purifier (Alltech Model 8132) was used to remove particulates and hydrocarbons.

The effect of critical reactor parameters (i.e., coating thickness, degree of fiber interfacial coverage and incident angles) on the rate of 4-CP degradation, according to reaction (12) was explored:

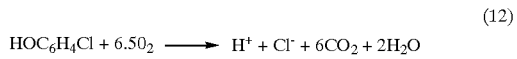

(12)

Figure 9:
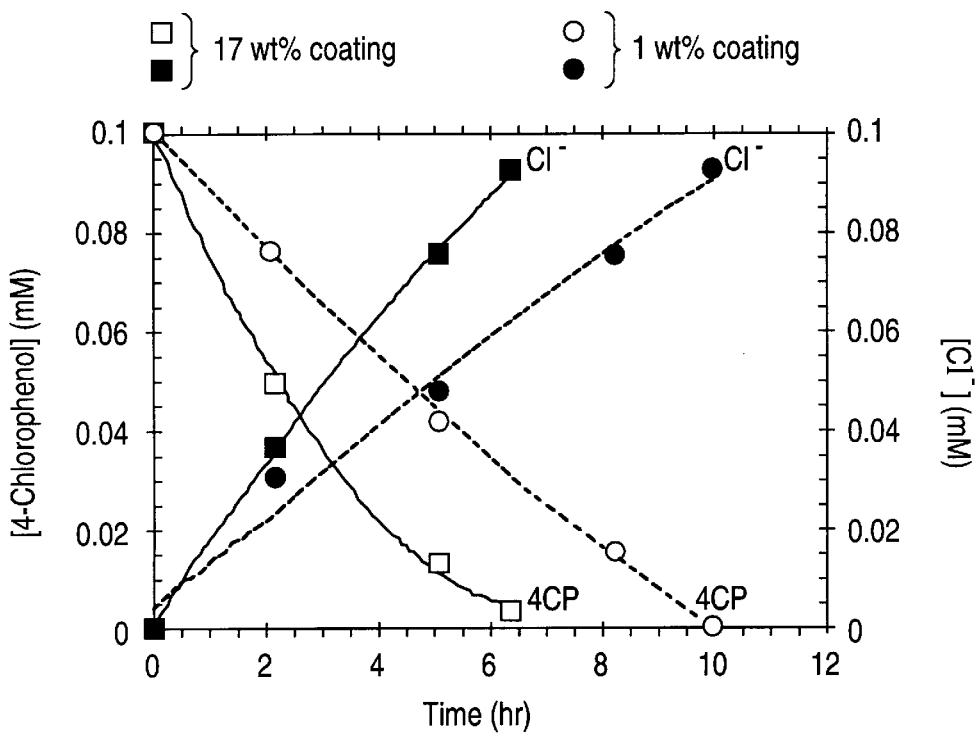
FIG. 9 is a graph showing 4-chlorophenol oxidation and chloride ion production as a function of time.

Control measurements of 4-CP were taken immediately after and one hour after bundle immersion without illumination; no change in the 4-CP concentration was observed. Complete degradation of 4-CP ([4-CP]$_{final}$≈0.01[4-CP]$_0$) took from 5 to 13 hours, depending on the specific reactor parameters. Input light fluxes were 10.8±0.8, 13.4±0.8, and 7.6±0.2 $\mu$Ein/min for incident angle geometries of 71°, 76° and 84°, respectively. Initial pH was 5.5 and $\lambda$ was 310–370 nm. 4-chlorophenol oxidation and chloride ion production as a function of time and sol TiO$_2$ content are shown in FIG. 9.

Figure 10A:
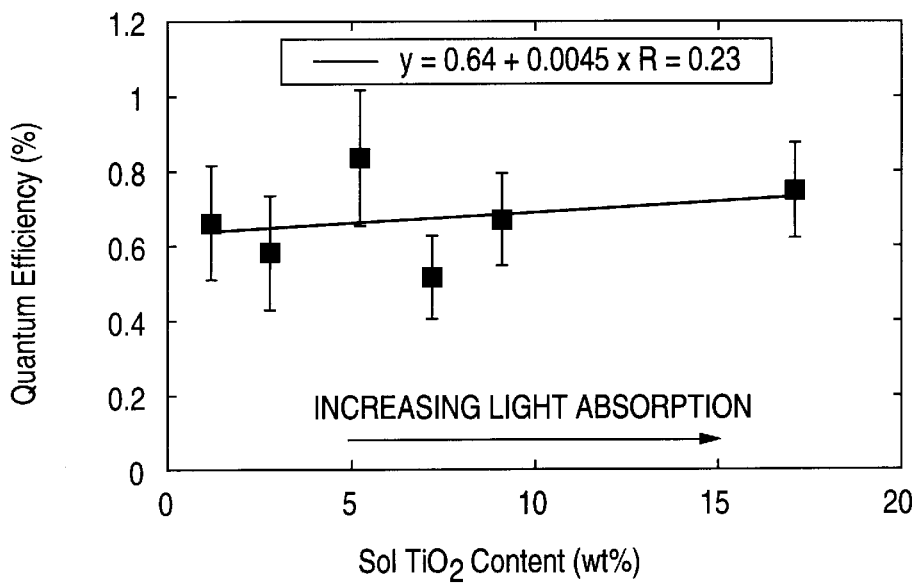
FIG. 10a shows the quantum efficiency for the oxidation of 4-CP as a function of increasing coating thickness (sol $TiO_2$ content)
Figure 10B:
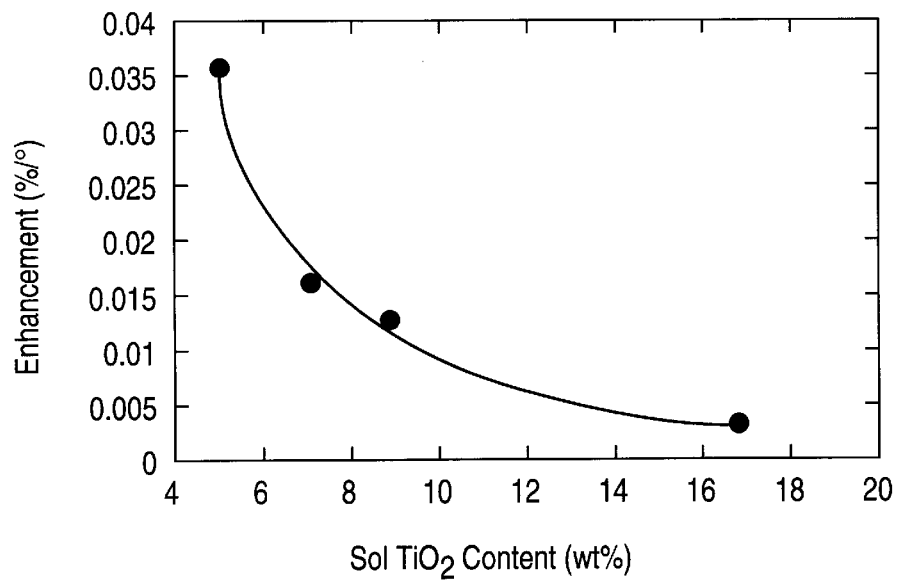
FIG. 10b shows the enhancement of the quantum efficiency ($\Delta\phi$) as a function of the thickness coating ($TiO_2$ sol content); ($\Delta\phi$ is the difference in the quantum efficiencies obtained with incident angles of 84° and 71°, i.e., $\phi_{84°}-\phi_{71°}$)

FIGS. 10a and 10b show the effect of increasing the minimum incident angle on the quantum efficiency of the fiber bundle reactor system. Change in the quantum efficiency as the incident angle increased from 71° to 84° is plotted against the coating sol concentration. Quantum efficiency, defined as $$\phi' \equiv \left| \left( \frac{-d[4CP]}{dt} \right)_o / I_{absorbed} \right|$$

was calculated as the ratio of the initial rate of oxidation of 4-CP to the flux of absorbed photons. As can be seen, increasing the minimum incident angle resulted in an increase in the measured quantum efficiency. For a 5 wt % sol coating, quantum efficiency rose from 0.006 to 0.011 as the minimum incident angle increased from 71° to 84°, an 83% increase. No apparent trend was seen with respect to the measured quantum efficiency and the input flux; thus, it is unlikely that the enhanced efficiency observed might be due to a reduction in the absorbed flux. As coating sol concentration increased, relative efficiency enhancement, $\Delta\phi$, decreased significantly, from 0.005 to 0.0004.

This result may be explained by the increase in refraction per reflection with increasing interfacial coverage. Enhanced refraction as a result of increased interfacial coverage offset the reduced reflections per unit length of fiber and refraction per reflection with an increase in the incident angle. Increases in the quantum efficiency at lower input and absorbed light intensities due to a reduction in charge-carrier recombination seen in other studies, was not observed, as reported by, for example, Albery, et al., *J. Chem. Soci. Farad. Trans.* I, 1985, 81, 1999, and Mills, et al., in *Environ. Sci. Tech.*, 1993, 27, 1681. Instead, the highest intensities occurred at a minimum incident angle of 76°. If the reported intensity effect were significant, then it would be expected that the efficiencies would be the lowest at this incident angle. However, this predicted trend was not observed. Thus, the "lower-intensity effect" does not appear to be important for the light intensities used in this set of experiments.

Minor delamination of the 17 wt % coating was observed during the oxidation experiments. However, the delamination did not significantly affect the measured light absorption or the ability of the FOCR to degrade 4-chlorophenol. $TiO_2$ from a 13 wt % coating that had been removed by sonication was filtered from the sonicated solution and weighed. The equivalent slurry phase concentration was approximately 0.03 wt %.

Mean quantum efficiency for 4-CP degradation varies with sol $TiO_2$ content, as shown in Table C, below. Minimum incident angle was 71° and input light was 10.8±0.8 $\mu$Ein/min. Initial 4-CP concentration was 0.10 mM, initial pH was 5.5 and $\lambda$=310–370 nm. From this data, no correlation was seen. However, when the effective quantum efficiency, $\phi''$, defined as $$\phi'' \equiv \left| \left( \frac{-d[4CP]}{dt} \right)_o / I_{input} \right|,$$

is plotted versus sol $TiO_2$ content, a linear correlation was apparent. Mean effective quantum efficiency increased as the sol $TiO_2$ content increased from about 0.0025 for the 1 wt % sol coatings to about 0.0075 for the 17 wt % coatings.

TABLE C

| Sol $TiO_2$ Content (wt %) | Mean Quantum Efficiency | Mean Effective Quantum Efficiency |
| --- | --- | --- |
| 1 | 0.007 | 0.03 |
| 2.5 | 0.006 | 0.004 |
| 5 | 0.0085 | 0.0055 |
| 7 | 0.005 | 0.003 |
| 9 | 0.007 | 0.005 |
| 13 | 0.010 | 0.8 |

These results indicate the effect of light distribution within the single fiber photocatalyst system on the efficiency of the FOCR system. The overall activated surface area of the coating was found to be the most important factor affecting efficiency. Coating thickness, uniformity and extent of light propagation down the fiber determined the activated surface area.

The effect of coating thickness on the oxidation rate of 4-chlorophenol was studied. Table D, below, summarizes the results. Input light was 10.8±0.8 $\mu$Ein/min; minimum incident angle was 71°; initial 4-CP concentration was 0.10 mM; initial pH was 5.5 and $\lambda$ was 310–370 nm.

As can be seen from Table D (FIG. 9), increasing the coating sol $TiO_2$ content from 1 to 17 wt % reduced degradation time by approximately 35%. However, total absorbed light flux of the 17 wt % coating was 96% greater than the absorbed flux for the coating prepared from the 1 wt % sol. Therefore, in a fiber optic reactor system according to the present invention, the reactive surface area can be increased readily by adding more coated fibers to the bundle without increasing the light scattering that limits reaction rates, as reported by Al-Sayyed, et al., *J. Photochem. Photobiol. A: Chem.*, 1991 58, 99 and Tseng, et al., *Wat. Sci. Tech.*, 1991, 23, 377, incorporated herein in their entireties by reference.

TABLE D

| 1 wt % ($I_{abs}$ = 5.0 $\mu$Ein/min) | | | 17 wt % ($I_{abs}$ = 9.8 $\mu$Ein/min) | | |
| --- | --- | --- | --- | --- | --- |
| Time (hours) | [4-CP] (mM) | [Cl⁻] (mM) | Time (hours) | [4-CP] (mM) | [Cl⁻] (mM) |
| 0 | 0.1 | 0 | 0 | 0.10 | 0 |
| 2 | 0.078 | 0.03 | 2 | 0.05 | 0.035 |
| 5 | 0.04 | 0.05 | 5 | 0.013 | 0.075 |
| 8.5 | 0.015 | 0.075 | 6.5 | 0.003 | 0.092 |
| 10 | 0.00 | 0.095 | | | |

By controlling incident angle, coating thickness and interfacial coverage, the preferred activated surface area can be identified. A coating with minimal interfacial surface area of the quartz core and the $TiO_2$ particles and an incident angle approaching 90° will extend the light propagation down the fiber, concomitantly increasing the illuminated surface area. Suitable coatings having a thickness equal to four or five times the inverse of its extinction coefficient should achieve 100% absorption of incident refracted photons. Coating thickness has a much greater impact on the activated surface area, and hence, efficiency, than on the extent of photocatalyst activation (i.e., the extent of light propagation down the fiber).

Oxidation efficiency of the system also depends on the ability of the chemical species of interest to diffuse into the illuminated photocatalyst matrix or the charge carriers to migrate to the photocatalyst-reaction solution interface or both. For example, in order for the charge carriers generated in the inner coating layers to be effectively utilized, 4-CP must diffuse into the activated inner layers of the $TiO_2$ on the fibers and/or the charge carriers must migrate outward toward the solid-liquid interface. The characteristic time for pore diffusion of 4-CP can be estimated as follows:

$$t_{diffusion} = \frac{L^2}{D} \quad (14)$$

where L and D are the characteristic length of the $TiO_2$-matrix and the molecular diffusivity of 4-CP, respectively. The mean pore radii for $TiO_2$ sol gel membranes are approximately five times greater than the size of a chlorophenol molecule (ca. 4 Å) as reported by Xu, et al., above, Hu, et al., above, and Aguado, et al., in *J. Mol. Catal.*, 1994, 89, 165. For a pore radius of 20 Å and $D_{4-CP}=10^{-9}$ $m^2s^{-1}$, the characteristic time for diffusion is 3 ns. The characteristic time for the oxidation of 4-CP by •OH is much longer than 3 ns. Therefore, it is more appropriate to use the characteristic length for diffusion through a porous medium, generally taken to be three times the coating layer thickness due to pore tortuosity. In this case, with a path length of 15 $\mu$m, the characteristic time for pore diffusion was 0.2 s. Although the local [•OH] and [4-CP] were not determined from this data, an estimated reaction rate based on literature values of k=1 $\mu$Mmin$^{-1}$ as reported by Hoffmann, et al., in *Chem. Rev.*, 1995, 95, 69, incorporated herein by reference in its entirety, for $TiO_2$ films and slurries, indicated that the degradation occurs in a reaction-limited regime, in which the availability of 4-CP at the photocatalytic interface is not limiting.

The weak positive correlation between the quantum efficiency and the sol $TiO_2$ content tabulated in Table D suggests that the light absorbed by the coatings of varying thickness is being used equally well. The effective quantum efficiency, however, strongly correlated with the sol $TiO_2$ content (Table D), suggesting that oxidation of 4-CP was not mass transport limited. A thicker coating with a higher active surface area appears to be effective in utilizing absorbed photons to effect degradation. Thus, the charge carriers generated in the inner layers of the photocatalyst appear to be as efficient at inducing redox chemistry as those generated in the outer layers.

In a diffusion-limited system, productive use of the $e^-/h^+$ pairs generated in the inner photocatalyst layers would require their migration to the redox substrates in the outer layers. Studies of the mobility and recombination rates within a single $TiO_2$ crystal have shown that recombination rates exceed by an order of magnitude transfer rates of the charge carriers out of the particle. It is generally believed that surface defects, such as grain boundaries, facilitate recombination. Charge carrier lifetimes in $TiO_2$ porous films have been studied recently. Sodergren, et al. estimated an electron diffusion length of 0.8 $\mu$m, under steady-state conditions, that was confirmed by experiment and concluded that the electron diffusion length is inversely dependent on the charge carrier recombination rate. Konenkamp, et al. reported a characteristic length of 0.1 $\mu$m under transient conditions. Under steady-state illumination conditions, transport of excess electrons from the inner layers of a 1 $\mu$m thick film is relatively slow (i.e., >1 ms). In addition, electron mobilities appear to be higher than hole mobilities for small colloidal crystallites.

EXAMPLE 4

Comparison to Slurry Reactor

In an attempt to establish a benchmark for the effectiveness of the immobilized photocatalyst in the FOCR according to the present invention, a comparison was made between the characteristic quantum efficiency of a slurry-phase reactor system and the FOCR. Unlike most fixed-bed reactor configurations, a slurry-phase reactor configuration has the inherent advantage of a uniformly distributed photocatalyst and a high photocatalytic surface-area-to-reactor-volume ratio. Slurry-phase reactor conditions were simulated by irradiating a 200 mL well-mixed solution of 0.1 mM 4-CP and 0.1 wt % $TiO_2$ (Degussa P25), with 7.6 $\mu$Ein/min (310$\leq\lambda\leq$375 nm) in a 250 ml, uncovered beaker for 2 hours. An average relative quantum efficiency of 0.0065±0.0002 was measured. This value can be compared to an average value of 0.006 and a maximum value of 0.011 for the FOCR operating under comparable conditions. Thus, the FOCR system has the advantages of a fixed-bed system (described earlier) while also achieving similar reaction efficiencies of a slurry-phase reactor system.

Stoichiometry Determination

Experimental

Sample solutions (190 mL of 4-chlorophenol (Aldrich), pentachlorophenol (PCP) (Aldrich), dichloroacetate (DCA) (Spectrum), and oxalate (Sigma) --of varying initial concentrations, pH, and ionic strength (Table A) were prepared from stock solutions. Before irradiation, the coated-fiber bundle was immersed in the reaction solution and allowed to equilibrate for 30 min. Nylon (Nalgene 0.45 $\mu$m) or TEFLON (Acrodisc 4CRPTFE 0.45 $\mu$m) syringe filters were used to filter all samples.

Chloride production was followed by chemical potentiometry using a Cl— specific electrode (Orion 9617BN, 1.0 M $NaNO_3$ matrix) and by ion chromatography (Dionex BIOLC 4500i Series). The pH was determined with a Radiometer PHM85 pH meter while constant pH was maintained with a pH-stat (Radiometer PHM85 pH meter, a Radiometer TTT80 Titrator, and a Radiometer ABU80 Autoburette). 4-CP and PCP and associated intermediates were analyzed spectrophotometrically and by HPLC ($\lambda$=224/280 and 224/250 nm, respectively). TOC was determined with a TOC analyzer (Shimadzu TOC5000). Oxalate and DCA were quantified by ion chromatography (Dionex BIOLC 4500i Series). Pure (Liquid Air) oxygen was used at saturation as the primary electron acceptor and to mix the reactor via continuous sparging, which was passed through an in-line gas purifier (Alltech 8132).

Results

In order to determine the ability of the entire OFR system to degrade effectively various hydrocarbon species of interest, the complete degradation of 4-CP, PCP, DCA, and oxalate were investigated. The reaction conditions and results of these experiments are listed in Table A. The time-dependent chemical concentration profiles for the oxidation of 4-CP and for the production of intermediates and products are shown in FIG. 9. Complete degradation of 4-CP was achieved after 10 hours of irradiation at I=5.3 $\mu$Ein min$^{-1}$ and pH 5.5 with a stoichiometric production of Cl—. No intermediates were detected although both benzoquinone and hydroquinone were detected in other photooxidation experiments at concentrations less than 10 $\mu$M and were subsequently photooxidized. Complete disappearance of total organic carbon was observed within 12 hours with a net quantum efficiency of $\phi$=0.010 for 4-CP degradation.

PCP was totally degraded after 6 hrs. with mineralization achieved after 13 hrs. of irradiation with a stoichiometric production of Cl— (FIG. 11). Tetrachlorohydroquinone was detected as an intermediate at a maximum concentration of 30 $\mu$M. A photochemical reaction half-life of 3.0 hrs. and a quantum efficiency of $\phi$=0.015 were determined.

The photooxidation of DCA (FIG. 11) was examined at two different absorbed light intensities (i.e., 7.0 and 4.2 μEin min$^{-1}$) that correspond to the minimum incident angles of light introduction into the fibers of $\theta_i$=76° and $\theta_i$=84°, respectively. In general, larger incident angles were shown to result in higher quantum efficiencies, as we reported in our 1995 paper (in *Environ. Sci. Technol.*). Complete degradation of DCA was achieved after 10 hrs. of irradiation at the higher intensity while 96% degradation was achieved after 14 hrs. at the lower intensity. Chloride production was 100% and 88% of stoichiometric for the higher and lower intensity irradiations, respectively. In addition, 98% and 91% of the TOC levels were eliminated after 13.5 and 14 hours, respectively. However, the quantum efficiency for the lower intensity (i.e., 4.2 μEin min$^{-1}$), higher incident angle irradiation was higher (φ=0.095) than the higher intensity irradiation (φ=0.07).

Complete mineralization of $C_2O_4^{2-}$ (1.0 mM) over the pH range of 4.5–5.0 was observed after five hours of irradiation. TOC reduction was only slightly out of phase. In the case of $C_2O_4^{2-}$, $\phi C_2O_4^{2-}$=0.18.

Discussion

4-CP, PCP, DCA, and OX undergo photocatalytic oxidation via several mechanistic pathways including direct and indirect hole transfer and inner-sphere and outer sphere electron transfer (Eqs. 2–5) These compounds have moderate to high water solubilities and low volatilities. 4-CP and PCP have been reported to undergo hydroxyl radical insertion as an initial step in the overall oxidation. DCA and oxalate are believed to undergo hydrogen abstraction and direct hole transfer, respectively.

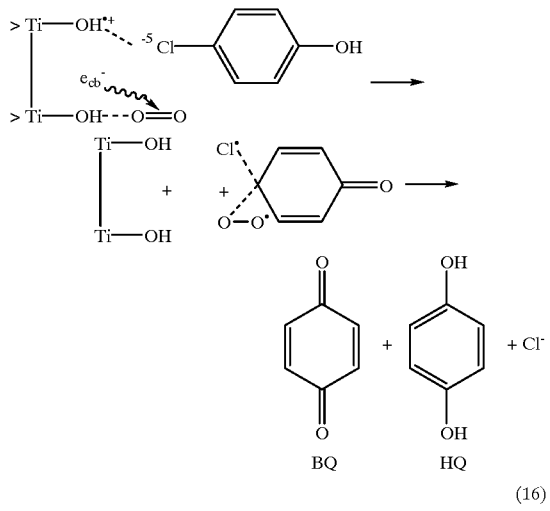

(15)

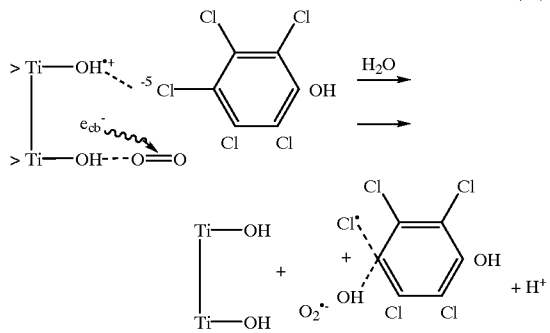

(16)

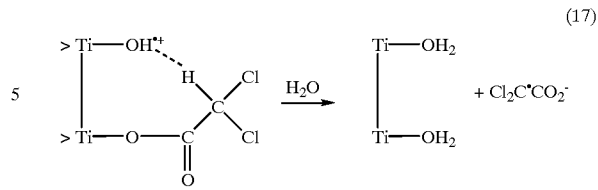

(17)

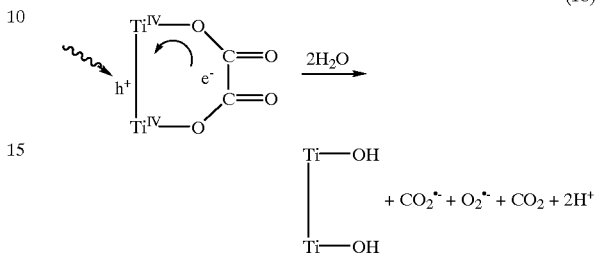

(18)

Apparent quantum efficiencies are comparable to those reported for slurry-phase oxidations. As noted earlier, apparent quantum efficiencies of 0.065 and 0.013 for slurry-phase oxidation of 4-CP were reported. Hofstadler et al. achieved apparent quantum efficiencies of only 0.0002 in a fixed-bed reactor employing $TiO_2$-coated quartz fiber rods. An apparent quantum efficiency of φ≈0.013 was reported by Mills and Hoffmann for slurry-phase oxidation of PCP for I=9.1 μEinL$^{-1}$·min$^{-1}$ and a $TiO_2$ loading of 0.2 g-L$^{-1}$ at pH 5. Based on data presented by Barbeni et al. for the photocatalytic degradation of PCP, apparent quantum efficiencies ranging from φ=0.022–0.037 for pH values of 3.0 and 10.5, respectively, and for I=33 μEinL$^{-1}$ min$^{-1}$ and a 2 g-L$^{-1}$ $TiO_2$ loading, were determined. Total mineralizations (i.e., conversion to $CO_2$, H$^+$, Cl$^-$) were observed. The relatively long irradiation times, up to 14 hours, were due to the low light intensities employed (e.g., 6 compared to 500 μEin L$^{-1}$ min$^{-1}$). Higher light intensities can be achieved by employing a larger fiber cable collector with a greater number of fibers and with more efficient light coupling interfaces.

We have demonstrated that an OFR is a promising configuration for the practical application of $TiO_2$ photocatalysis for the reinediation of contaminated waste streams. The OFR system has the inherent advantages of a fixed-bed reactor, coupled with the photochemical quantum efficiencies of a slurry-phase reactor. The OFR is operable over a broad range of pH and ionic strength and it can catalyze the degradation of a broad range of chemical compounds. Finally, it has the potential to greatly enhance chemical quantum efficiencies which is vital for the future viability of LTV/photocatalysis as an advanced oxidation technology.

The fiber optic cable reactor (FOCR) enables remote delivery of light from a light source to the photocatalyst and minimizes deleterious effects on the activity of the photocatalyst due to heat build-up and coating delamination.

Many of the problems encountered in the prior art associated with the use of optical fibers for light transmission and for solid supports for heterogeneous photocatalysis were overcome in the present invention. No deactivation of the photocatalyst due to heat buildup as predicted by Ollis and Marinangeli was observed. Separation of the coated fibers and heat removal by the reaction solution appear to control the temperature of the photocatalyst coating thereby preventing adverse thermal effects. Quantum efficiencies two orders of magnitude greater than the those reported for the tubular reactor of the Hofstadler, et al. for the oxidation of 4-chlorophenol were achieved. The use of a fiber separator and relatively stiffer fibers eliminated the delamination problem observed by others except for the thickest coatings. Moreover, the delamination observed in the latter case did not significantly affect the efficiency of the FOCR for 4-chlorophenol degradation.

The FOCR of the present invention has inherent advantages of a fixed-bed design coupled with the reaction efficiencies of a slurry-phase reactor. The FOCR configuration enhances uniformity and distribution of activated photocatalyst within a given reaction volume relative to conventional fixed bed reactor designs. These characteristics reduce mass transport limitations to photochemical conversion efficiency and allow for higher processing capacities. In addition, the possibility of light loss via absorption or scattering by the reaction medium is minimized.

The FOCR of the present invention can be used in either batch- or continuous-flow operation for liquid- and/or gas-phase reactions. Unlike in conventional photocatalytic reactor configurations, the present invention enables the use of a light source located remotely from the photocatalyst. Thus, light may be delivered to the photocatalyst for carrying out the desired chemical reaction, without heat buildup in the fibers and deactivation of the photocatalyst thereby. As a result, catalyst-coated quartz optical fibers can be utilized for in situ remediation of contaminated subsurface environments and treatment of either liquid and/or vapor phase contaminants such as chlorinated hydrocarbons.

While the present invention is disclosed by reference to the preferred embodiments and examples detailed above, it is to be understood that these examples are intended in an illustrative rather than limiting sense, and it is contemplated that modifications within the spirit and scope of the invention will readily occur to those skilled in the art, which modifications are intended to be encompassed within the scope of the appended claims.

We claim:

1. A chemical reactor comprising one or more optical fibers having a catalytic portion, a non-catalytic portion, and a $TiO_2$-containing photocatalytic coating on the catalytic portion, wherein the photocatalytic coating is formed on the fibers by a method comprising the step of:

applying the photocatalytic coating from a solution of $TiO_2$ in a solvent;

and wherein the non-catalytic portion of each optical fiber extends through a spacer to separate the optical fibers from each other.

2. A chemical reactor according to claim 1, wherein the solution is a hydrosol.

3. A chemical reactor according to claim 1, wherein the fibers have a diameter of at least 400 nm and are composed of a uv-transmitting material.

* * * * *